US012515698B2

(12) United States Patent
Linscott

(10) Patent No.: US 12,515,698 B2
(45) Date of Patent: Jan. 6, 2026

(54) REFINEMENT TRAINING FOR MACHINE-LEARNED VEHICLE CONTROL MODEL

(71) Applicant: Zoox, Inc., Foster City, CA (US)

(72) Inventor: Gary Linscott, Seattle, WA (US)

(73) Assignee: Zoox, Inc., Foster City, CA (US)

( * ) Notice: Subject to any disclaimer, the term of this patent is extended or adjusted under 35 U.S.C. 154(b) by 129 days.

(21) Appl. No.: 18/522,034

(22) Filed: Nov. 28, 2023

(65) Prior Publication Data

US 2025/0171046 A1   May 29, 2025

(51) Int. Cl.
  B60W 60/00   (2020.01)
  G06N 20/00   (2019.01)
(52) U.S. Cl.
  CPC ........... *B60W 60/001* (2020.02); *G06N 20/00* (2019.01)
(58) Field of Classification Search
  CPC ............................. B60W 60/001; G06N 20/00
  See application file for complete search history.

(56) References Cited

U.S. PATENT DOCUMENTS

| 10,649,459 | B2 | 5/2020 | Wang et al. | |
|---|---|---|---|---|
| 11,203,362 | B1* | 12/2021 | Beijbom | G06N 3/042 |
| 2019/0042859 | A1* | 2/2019 | Schubert | G05D 1/00 |
| 2020/0150671 | A1* | 5/2020 | Fan | B60W 60/0011 |
| 2021/0173402 | A1* | 6/2021 | Chang | G05D 1/0221 |
| 2021/0181758 | A1 | 6/2021 | Das et al. | |
| 2021/0200212 | A1* | 7/2021 | Urtasun | G05D 1/0214 |
| 2023/0406360 | A1* | 12/2023 | Al-Rfou | B60W 40/04 |
| 2024/0428682 | A1* | 12/2024 | Ramamoorthy | G06N 3/0475 |

OTHER PUBLICATIONS

Liu et al., "Statistical Rejection Sampling Improves Preference Optimization," Goggle Research, arXiv:2309.06657v1 [cs.CL], Sep. 13, 2023, 20 pages.
Rafallov et al., "Direct Preference Optimization: Your Language Model is Secretly a Reward Model," Stanford University, May 29, 2023, 26 pages.
Ouyang, "Training language models to follow instructions with human feedback," Open AI, Mar. 4, 2022, 68 pages.
Lambert et al., "Illustrating Reinforcement Learning from Human Feedback (RLHF)," 2022, 15 pages.
U.S. Appl. No. 18/217,187, filed Jun. 30, 2023.
U.S. Appl. No. 17/187,721, filed Feb. 26, 2012.
U.S. Appl. No. 16/682,971, filed Nov. 13, 2019.

* cited by examiner

*Primary Examiner* — Jelani A Smith
(74) *Attorney, Agent, or Firm* — Lee & Hayes, P.C.

(57) ABSTRACT

A machine-learned model that uses sensor and/or perception data to directly determine controls for operating an autonomous vehicle may be trained by identifying a preferred trajectory between a human-driven and vehicle-controlled trajectory, and using a first loss determined between the vehicle-controlled trajectory and the path the autonomous vehicle ultimately ended up taking in a scenario and a second loss determined between the vehicle-controlled trajectory and the human-driven trajectory to refine the machine-learned model. The machine-learned model may additionally or alternatively be refined by a learned reward model constructed by replacing one or more output heads of the machine-learned model with a regression head that is trained using performance metrics determined for the vehicle-controlled trajectory.

20 Claims, 4 Drawing Sheets

REFINEMENT TRAINING FOR MACHINE-LEARNED VEHICLE CONTROL MODEL

BACKGROUND

Despite advances in machine-learning and artificial intelligence, some uses of machine-learned models may be required to execute at highly performant levels. For example, autonomous vehicles integrating machine-learned models may be required to perform as well as or better than humans. Improving the safety and efficacy of an autonomous vehicle's operations may be contingent upon making further improvements to the models upon which the autonomous vehicle relies as part of controlling the autonomous vehicle. However, some techniques for improving the performance of an autonomous vehicle may result in improving some performance metrics while maintaining or regressing another performance metric.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
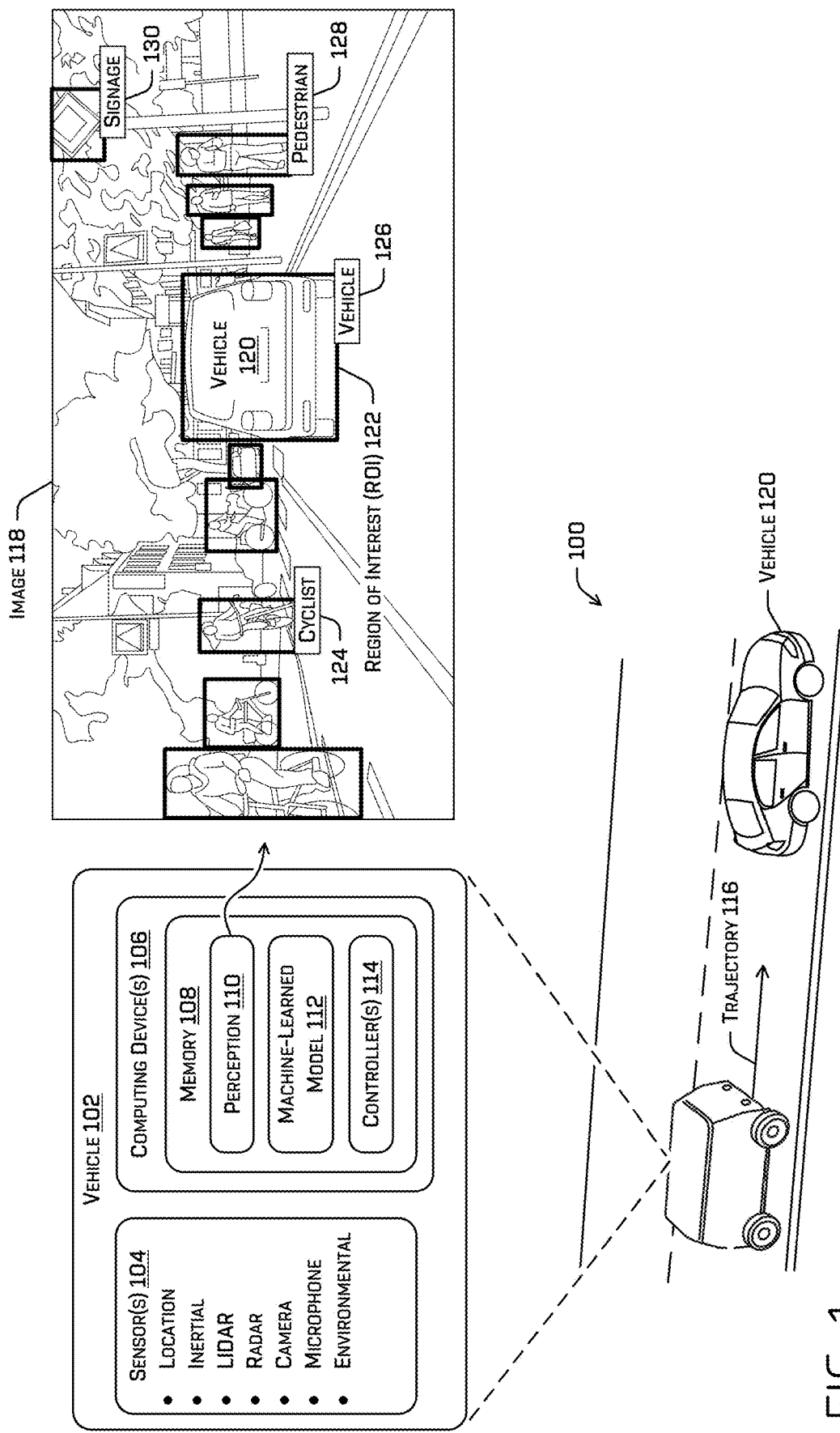
FIG. 1 illustrates an example scenario in which an autonomous vehicle is operating and determines perception data for example sensor data including an image.

As discussed above, attempts to improve a machine-learned model may result in improving some performance metrics while maintaining or regressing other performance metrics. This may be troublesome because some technical fields, like autonomous control, may have stringent requirements for performance where any regression is intolerable and improvement to such performance metrics may result in the increase safety and efficacy of the technology into which such a machine-learned model is integrated. For example, in the autonomous vehicle space, improving these performance metrics may result in safe, more comfortable, and more efficient operations of the autonomous vehicle.

The techniques (e.g., hardware, software, machines, and/or processes) discussed herein may include refinement training to improve a machine-learned model used by an autonomous vehicle as part of controlling operations of the autonomous vehicle, such as movement, door/aperture control, and/or the like. In some examples, the refinement training may result in improving all the performance metrics that are tracked for operations of the vehicle and may include targeted performance improvement for one or more performance metrics that other techniques may have failed to improve or have caused to regress. Such performance metrics may include, for example, safety metrics, progress metrics, and/or comfort metrics. Safety metrics could be based on a variety of data such as, how often the autonomous vehicle comes within a threshold distance of an object, how much deceleration the autonomous vehicle or another object needs to exert to avoid a collision, a minimum braking distance to avoid an object, and/or the like. Progress metrics could be based on how far along a path or towards a target state the autonomous vehicle progresses in executing its operations. Comfort metrics could be based on data such as a lateral and/or longitudinal acceleration and/or jerk associated with the autonomous vehicle's movements, and/or the like (which, in some examples, may impact the comfort of a rider).

The techniques discussed herein may receive a set of scenario data identifying a vehicle state of the autonomous vehicle in an environment and environment state data. In some examples, the set of scenario data may have been generated based at least in part on real-world log data received from an autonomous vehicle and/or may comprise synthetically generated (e.g., computer-generated) scenarios. Regardless, the vehicle state may indicate a position and/or orientation of the autonomous vehicle within the environment, a velocity, acceleration, steering angle, and/or the like associated with the autonomous vehicle at the beginning of a scenario. The environment state data may indicate map data and/or object data, either of which may be defined to be static for the duration of the scenario or may indicate changes to such data over the course of the scenario. For example, the map data may indicate a location and/or extents of static object(s) (e.g., objects that don't move) in the environment and/or salient portions of the environment, such as a roadway, crosswalk, sidewalk, signage, and/or or the like. In some examples, some portions of the map data may be dynamic, such as a traffic light state, permitted traffic flow (e.g., such as at a toll, a lane that closes/opens or changes direction of travel depending on the time of day, a time or passenger-conditional rideshare lane, a moveable bridge, a construction site), and/or the like. The object data may indicate various data associated with dynamic object(s) (e.g., objects capable of their own movement) in the environment, such as an object classification, object state (e.g., position, orientation, velocity, acceleration, steering rate, aperture/door open/closed, loading/unloading), path, and/or the like. In some examples, the object data stored as part of a scenario may indicate a change in object state over time, such as an object moving in the environment, a door of a vehicle opening/closing, a pedestrian entering a building or exiting a vehicle, and/or the like.

The techniques may additionally comprise receiving a set of vehicle trajectories and driver trajectories associated with each scenario of the set of scenarios. The vehicle trajectories may identify how the autonomous vehicle operated during a scenario and the driver trajectories may identify how a driver operated a vehicle during the same scenario. Each scenario may have a vehicle trajectory and driver trajectory associated therewith. In some examples, a vehicle trajectory may be based at least in part on an output of the machine-learned model discussed herein. For example, the machine-learned model may determine a trajectory for controlling the autonomous vehicle based at least in part on sensor data and/or perception data generated by the autonomous vehicle based on sensor data.

In some examples, the scenarios may be simulated and simulation data may be provided to the machine-learned model. For example, the simulation data for a scenario may comprise simulated sensor data and/or simulated perception data that may be provided as input to the machine-learned model. How the vehicle operates may be tracked and stored, such as a vehicle trajectory that may be stored in association with the scenario. For example, the machine-learned model of the autonomous vehicle may use simulated sensor data and/or simulated perception data to determine controls for operating a simulated autonomous vehicle during the scenario. The simulation may simulate operations of the simulated autonomous vehicle during the scenario, actions of dynamic object(s) in the scenario (as defined by the object data indicated by the scenario, and/or reactions of dynamic object(s) to the simulated autonomous vehicle's operations. In some examples, when the machine-learned model is updated, such as due to refinement or other updates, the vehicle trajectories may be re-generated by re-simulating the scenarios and operating the vehicle in the scenarios, such as by simulating the scenarios, providing simulation data to the vehicle, and storing how the vehicle operated during the scenario, including storing the vehicle's trajectory during the scenario. In some examples, multiple vehicle trajectories may be associated with a scenario, such as vehicle trajectories generated by different versions of the machine-learned model.

In some examples, a driver trajectory may be generated by simulating a scenario and providing simulation data to a driver system. The driver system may comprise a display, speaker, and/or the like to display the simulation data and may comprise steering controls for the driver, such as a steering wheel, accelerator pedal, brake pedal, turn indicator, headlights control, door control (e.g., to lock/unlock or open/close a door), and/or the like. In such an example, the driver may be a human driver, such as an expert human driver. Additionally or alternatively, the driver may be an advanced machine-learned model component that may require more computational processing and/or storage than is feasible to implement on the autonomous vehicle. Regardless, a human or advanced machine-learned model may determine controls for controlling a simulation of a vehicle in a scenario.

Additionally or alternatively, the vehicle trajectory or driver trajectory associated with a scenario may comprise one or more vehicle trajectories generated by the machine-learned model or one or more drive trajectories received from the driver for controlling the simulated vehicle during the scenario, although, for simplicity the examples discussed herein use the term trajectory describe the one or more trajectories. For example, a vehicle may determine a vehicle trajectory or series of vehicle trajectories for controlling the vehicle at each time step of the scenario and a driver may provide varying signals via the driver system to control the simulated system, which may be sampled at intervals to determine driver trajectories.

In some examples, performance metric(s) may be determined for a vehicle trajectory and/or for a driver trajectory executed for a scenario. For example, determining performance metric(s) for each of the vehicle trajectory and the driver trajectory may comprise determining how close the trajectory caused the simulated vehicle to come to an object, a minimum distance between the simulated vehicle and an object, whether the trajectory resulted in a collision, progress along a path accomplished by the trajectory, a lateral and/or longitudinal acceleration and/or jerk associated with the trajectory, etc. In some examples, determining the performance metric(s) may comprise determining a safety metric, progress metric, and/or comfort metric associated with the vehicle trajectory and a safety metric, progress metric, and/or comfort metric associated with the driver trajectory. Additional and/or alternate performance metrics and details regarding determining safety, progress, comfort, and/or other costs are discussed in U.S. patent application Ser. No. 18/217,187, filed Jun. 30, 2023, the entirety of which is incorporated by reference herein for all purposes.

Refining the machine-learned model may include determining a preferred trajectory between the vehicle trajectory and the driver trajectory. Determining the preferred trajectory may include selecting the driver trajectory for direct preference optimization or using a learned reward model to determine a reward associated with the trajectory determined by the machine-learned model. After determining a preferred trajectory from among the vehicle trajectory and driver trajectory for each scenario, the techniques may comprise determining a loss for each preferred trajectory, rejected trajectory, and scenario. Determining the loss for a single scenario may comprise determining a difference between the preferred trajectory and the rejected trajectory, normalizing that difference, and projecting it into a log space in a manner that indicates/weights the preferred trajectory. This loss may then be used to refine the machine-learned model to reduce the loss (e.g., via gradient descent), which functionally means the machine-learned model would be more likely to produce an output closer to the preferred trajectory upon re-running the simulation of the scenario. In some examples, the loss may be determined and/or the machine-learned model may be altered by a direct preference optimization or by a reinforcement learning process.

In some examples, the set of vehicle trajectories (and corresponding set of driver trajectories) used to refine the model may be determined based at least in part on targeting scenarios for which the autonomous vehicle performed poorly and/or by targeting poor performance as indicated by a specific performance metric. Targeting the refinement of the machine-learned model to improve performance on scenarios in which the machine-learned model performed poorly and/or targeting improvement of a particular performance metric may comprise determining a subset of vehicle trajectories from among the set of vehicle trajectories associated with a performance metric or aggregate performance metric that is below a threshold performance metric. For example, to determine scenarios for which the machine-learned model performed poorly, generally, the aggregate performance metric may be an average or weighted average of multiple performance metrics (e.g., a safety metric, progress metric, comfort metric) or may include determining that one or more or a specific number of the metrics are below a threshold performance metric. To target improving performance for a particular metric, the techniques may include determining a subset of vehicle trajectories for which that specific metric is below a threshold performance metric, e.g., the safety metric is below a threshold performance metric. In some examples, some additional vehicle trajectories where the vehicle performed well (e.g., the performance metric or aggregate performance metric was above the threshold performance metric) may also be added to the subset for diversity of the refinement training set and to prevent regression of the machine-learned model for scenarios associated with those vehicle trajectories. Either way, the set of vehicle trajectories and corresponding scenarios and driver trajectories may be used for the techniques discussed herein. In other words, the set of vehicle trajectories discussed herein may be part of a superset of vehicle trajectories that includes additional vehicle trajectories that were filtered out for use in the techniques discussed herein.

Once refining training has been completed, an updated version of the machine-learned model may be transmitted to an autonomous vehicle. Additionally or alternatively, the updated version of the machine-learned model may be tested before transmitting it to an autonomous vehicle. For example, the scenarios may be re-simulated and a new set of vehicle trajectories may be determined by the updated machine-learned model in each of the scenarios. This performance metric(s) may be determined for this new set of vehicle trajectories and the updated machine-learned model may be transmitted to the autonomous vehicle so long as the performance metric(s) stay the same or improve.

The techniques discussed herein may increase safety and efficacy of a vehicle by refining a machine-learned model. More specifically, the techniques may improve one or more performance metrics of an autonomous vehicle, such as how safe the autonomous vehicle is, how much progress the autonomous vehicle makes along a path, how comfortable a ride is associated with the vehicle, and/or how natural movement of the vehicle is. Additionally or alternatively, the techniques may increase the number of situations in which the vehicle operates efficiently and/or efficiently. The techniques may reduce collisions, near-misses, jerky behavior, and inefficient movements. Regarding efficiency, the improvements to efficient travel may reduce vehicle usage, energy consumption, and the like, thereby decreasing the environmental impact of the vehicle. Moreover, the machine-learned model discussed herein may reduce or remove the need for predicting an object's future state, modeling a future environment, and/or a planning component that simulates and/or fuses historical, current, and predicted object and/or environmental states to control the vehicle. Accordingly, the techniques discussed herein may reduce the amount of computational processing, network bandwidth, and/or power consumption to control the vehicle, while simplifying the computational complexity and increasing the interpretability of and ability to debug the components of the vehicle.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, aircraft, watercraft, and/or the like.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), odometry data (which may be determined based at least in part on inertial measurements and/or an odometer of the vehicle 102), a depth position sensor (e.g., a lidar sensor, a radar sensor, a sonar sensor, a time of flight (ToF) camera, a depth camera, an ultrasonic and/or sonar sensor), an image sensor (e.g., a visual light camera, infrared camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, machine-learned model 112, and/or system controller(s) 114. For example, the memory 108 may store processor-executable instructions that, when executed by one or more processors, execute various operations discussed herein. In some examples, the perception component 110 may include a simultaneous localization and mapping (SLAM) component.

In general, the perception component 110 may determine what is in the environment surrounding the vehicle 102 and the machine-learned model 112 may determine how to operate the vehicle 102 according to information received from the perception component 110. For example, the machine-learned model 112 may determine trajectory 116 for controlling the vehicle 102 based at least in part on the perception data and/or other information such as, for example, localization information (e.g., where the vehicle 102 is in the environment relative to a map and/or features detected by the perception component 110) and/or perception data. In some examples, the perception component 110 and/or machine-learned model 112 may comprise a pipeline of hardware and/or software, which may include one or more graphics processing unit(s) (GPU(s)), tensor processing unit(s) (TPU(s)), central processing unit(s) (CPU(s)), application-specific integrated circuit(s) (ASIC(s)), field-programmable gate array(s) (FPGA(s)), ML model(s), Kalman filter(s), and/or the like.

The trajectory 116 may comprise instructions for controller(s) 114 to actuate drive components of the vehicle 102 to effectuate a steering angle, steering rate, acceleration, and/or the like, which may result in a vehicle position, vehicle velocity, and/or vehicle acceleration. For example, the trajectory 116 may comprise a target heading, target steering angle, target steering rate, target position, target velocity, and/or target acceleration for the controller(s) 114 to track. In some examples, the trajectory 116 may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters).

In some examples, the perception component 110 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), a pose of the vehicle (e.g. position and/or orientation in the environment, which may be determined by or in coordination with a localization component), local map data that identifies characteristics detected in proximity to the vehicle (e.g., locations and/or dimensions of buildings, trees, fences, fire hydrants, stop signs, and any other feature detectable in various sensor modalities), etc.

In particular, the perception component 110 may determine, based at least in part on sensor data, an object detection indicating an association of a portion of sensor data with an object in the environment. The object detection may indicate an object classification (e.g., semantic label, object state), sensor data segmentation (e.g., mask, instance segmentation, semantic segmentation), a region of interest (ROI) identifying a portion of sensor data associated with the object, object classification, and/or a confidence score indicating a likelihood (e.g., posterior probability) that the object classification, ROI, and/or sensor data segmentation is correct/accurate (there may be confidence score generated for each in some examples). For example, the ROI may include a portion of an image or radar data identified by an ML model or ML pipeline of the perception component 110 as being associated with the object, such as using a bounding box, mask, an instance segmentation, and/or a semantic segmentation. The object classifications determined by the perception component 110 may distinguish between different object types such as, for example, a passenger vehicle, a pedestrian, a bicyclist, a delivery truck, a semi-truck, traffic signage, and/or the like. In some examples, object detections may be tracked over time. For example, a track may associate two object detections generated at two different times as being associated with a same object and may comprise a historical and/or current object position, orientation, velocity, acceleration, classification, and/or other state of that object (e.g., door/aperture state, turning state, intent state such as activation turn signal).

To give a concrete example, the vehicle 102 may receive sensor data including image data (from one or more image sensors) and/or other sensor data associated with the environment, such as lidar data, radar data, ToF data, and/or the like. The perception component may detect and classify objects in the environment. For example, the perception component may receive image 118, which includes a representation of a vehicle 120, multiple cyclists, multiple pedestrians, multiple signage objects, and a variety of different environmental objects (e.g., roadway, sidewalk, trees, buildings). The perception component 110 may determine a region of interest (ROI) 122 based at least in part on detecting vehicle 120 as being represented in image 118. In the illustrated example, the ROI 122 is a bounding box, although other techniques for identifying the ROI are contemplated, such as an instance segmentation, semantic segmentation, mask, and/or a bounding shape other than a rectangle. FIG. 1 additionally depicts multiple other ROIs that may be generated by the perception component 110 for different objects that may be detected by the perception component 110, but, for simplicity and clarity, they are not all labeled. For example, the other ROIs identify cyclists, another vehicle, and traffic signage, although it is understood that additional or alternative portions of an image (and/or other sensor data) may be detected by the perception component 110.

In some examples, the perception component 110 may additionally or alternatively determine, by a first ML model, a classification of an object. For example, the first ML model may be trained to output an indication of a classification, from among a plurality of classifications, that corresponds with a highest probability determined by the ML model. The general classifications may include classifications such as, for example, "cyclist," "vehicle," "pedestrian," "animal," "environmental object," etc. In the depicted example, these classifications include classification 124, "cyclist"; classification 126, "vehicle"; classification 128, "pedestrian"; and classification 130, "signage". Although, for the sake of clarity, only a sampling of general classifications are depicted in FIG. 1, it is understood that the first ML model of the perception component 110 may determine a classification for one or more of the ROIs and/or objects detected from the sensor data.

The perception component 110 may additionally or alternatively determine a top-down representation of the environment based at least in part on the sensor data, as discussed in U.S. Patent Application Pub. No. 2021/0181758, filed Jan. 30, 2020, and/or U.S. Pat. No. 10,649,459, Apr. 26, 2018, the entirety of which are incorporated by reference herein for all purposes. For example, the top-down representation may be generated based at least in part on an object detection generated by the perception component 110 and/or map data. The map data may be stored in memory 108 and may indicate other stationary (static) objects and/or zones, such as crosswalks, sidewalks, signage, construction zones (e.g., which may be temporarily indicated in the map data), rules of the road (e.g., yield priority, right-of-way rules, speed limits, mandated stops) associated with regions of the environment (e.g., junctions, crosswalks, lanes), and/or the like.

For example, instead of indicating color data, a pixel of the top-down representation may indicate object data and/or map data, each of which may include one or more channels of the image. In an RGB image, a first channel indicates an amount of red at a pixel, a second channel indicates an amount of blue at the pixel, and a third channel indicates an amount green at the pixel, which collectively make up a color for that pixel. However, for a top-down representation, a pixel may have channel(s) dedicated to different object data that may include a global location of the pixel (i.e., a location in the environment that the pixel is associated with), whether an object is detected as existing at the pixel location or a likelihood that an object exists at the pixel/environment location, an orientation of an object indicated as existing at the location, a velocity and/or acceleration of the object, a classification associated with an object, whether an object is static or dynamic, a track associated with the object, a signage state (e.g., red light, green light, lane unavailable, directionality of a lane), other object state (e.g., left turn signal on, vehicle left side door open), map data, environment state data (e.g., a state of a traffic light, a weather condition, or the like, although environment state data may incorporate map data and/or object data in some examples), and/or the like. To further illustrate how this may practically be carried out as an example and without limitation, an object instance channel of the pixel may indicate a binary indication, such as 1 or 0, that an object exists at the pixel/location or a likelihood that an object exists at the pixel/location that was output by the perception component 110 as a number between 0 and 1 may be converted to a value that may depend on a number of bits or dynamic range associated with the pixel.

For example, if a channel of a pixel of the top-down representation has 32-bits, the likelihood may be converted to a 32-bit representation of the number between 0 and 1 a likelihood of 0.25 could be represented as the value 8 or a likelihood of 0.3 could be represented as the value 10 in the object instance channel for that pixel. Pixel channels may have more or less bits and may encode object data differently. For example, a semantic object classification may be encoded using a value where 0 represents no object being present, 1 represents a pedestrian, 2 represents a vehicle, 3 represents an oversized vehicle, 4 represents a construction zone, and/or the like. To give another candidate example, object orientation may be quantized such that orientations between 0 and 100 may be quantized as the value 0, orientations between 10° and 20° may be quantized as the value 1, and so on, depending on the number of bits available for an orientation channel associated with the pixel. In an additional or alternate example, one of the object channels may indicate whether other object channels are associated with current, previous, or predicted object data.

In some examples, multiple top-down representations of the environment may be determined in association with different times. For example, a first top-down representation may be associated with a current environment state (e.g., current object detections, map data, and/or general environment state data) and/or one or more second top-down representations may be associated with previous environment state(s).

The top-down representation may additionally or alternatively include channel(s) indicating map data, such as the existence of a roadway, a type of roadway junction (e.g., four-way controlled intersection, T-junction uncontrolled, six-way light-controlled intersection), signage existence and/or type (e.g., yield sign, traffic control light), sidewalk existence, region of interest (e.g., construction zone, crosswalk, parking location, passenger pickup/drop-off location), a direction of travel associated with a roadway, and/or the like. The channel(s) of the top-down representation may additionally or alternatively indicate that a location associated with a pixel is outside a roadway and/or a sidewalk.

The data produced by the perception component 110 may be collectively referred to as perception data, which may include a top-down representation, object detection data, and/or a track associated with an object. Once the perception component 110 has generated perception data, the perception component 110 may provide the perception data to the machine-learned model 112. The perception data may additionally or alternatively be stored in association with the sensor data as log data. This log data may be transmitted to a remote computing device (unillustrated in FIG. 1 for clarity) for use as at least part of training data for the machine-learned model 112.

The machine-learned model 112 may use the perception data received from perception component 110 to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, a planning component of the vehicle may determine a route for the vehicle 102 from a first location to a second location (e.g., a first location in the city to a second location in a city and the roadways therebetween to reach the second location from the first location) and the machine-learned model 112 may use the route as part of generating the trajectory 116. The machine-learned model 112 may additionally or alternatively determine additional operations of the vehicle, such as opening/closing an aperture, activating headlights/taillights/turn signals, activating a speaker, and/or the like. The trajectory 116 may be used by the system controller(s) 114 to generate a drive control signal that may be transmitted to drive components of the vehicle 102. In some examples, the machine-learned model 112 may be trained to determine a set of candidate trajectories using the perception data and/or sensor data and may select one of the candidate trajectories for output. In some examples, the machine-learned model 112 may do this without determining a probability distribution over the candidate trajectories and may be trained to select one of the multiple candidate trajectories for output.

FIG. 1 depicts an example of such a trajectory 116, represented as an arrow indicating a position, heading, velocity, and/or acceleration, although the trajectory itself may comprise instructions for controller(s) 114, which may, in turn, actuate a drive system of the vehicle 102. In some examples, the trajectory 116 may indicate a future state for the vehicle to achieve and the controller(s) 114 may determine instructions to actuate component(s) of the vehicle 202 to achieve that future state from a current state of the vehicle. In some examples, the controller(s) 114 may comprise software and/or hardware for actuating drive components of the vehicle 102 sufficient to track the trajectory 116. For example, the controller(s) 114 may comprise one or more proportional-integral-derivative (PID) controllers to control vehicle 102 to track trajectory 116.

Example System

Figure 2:
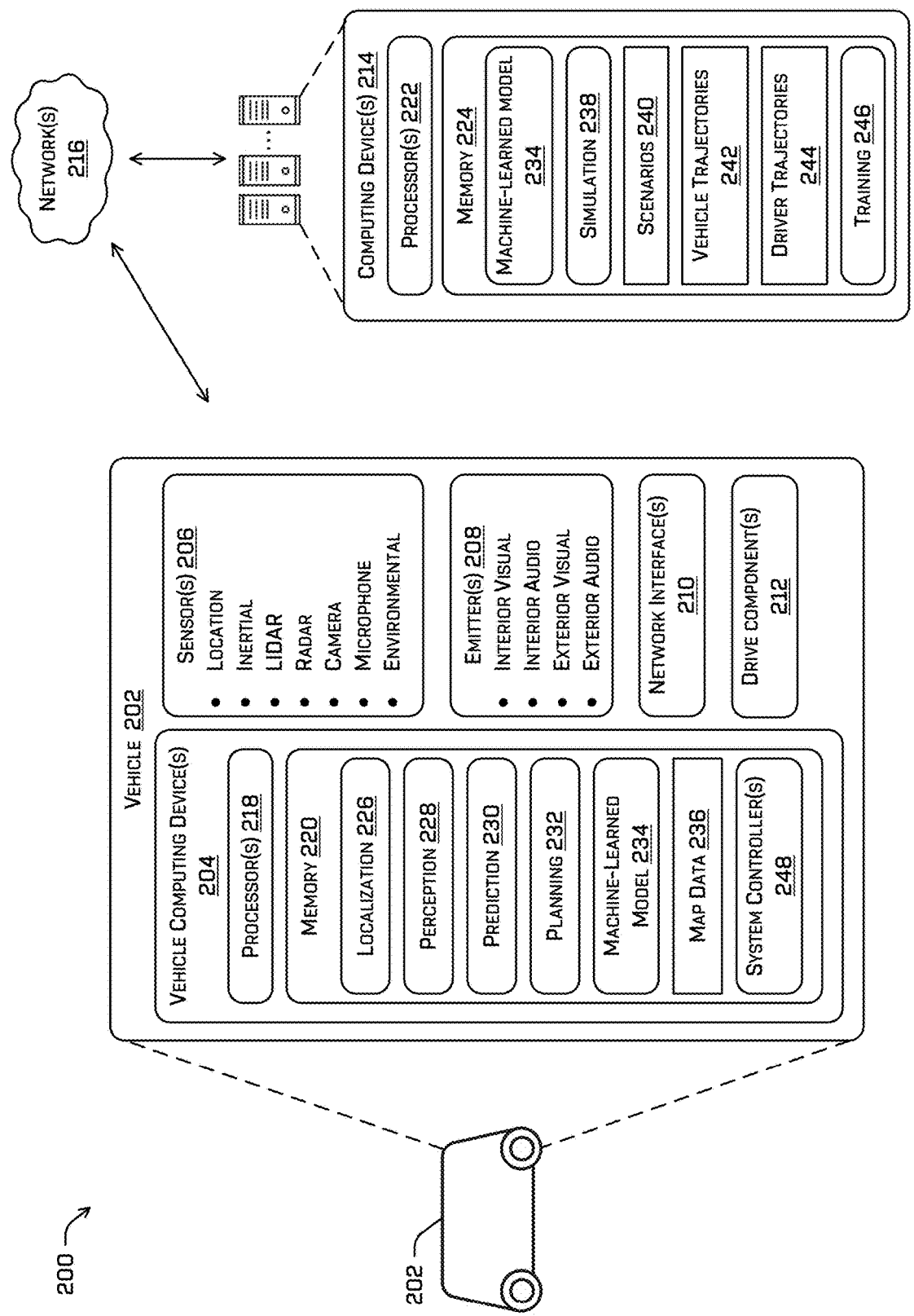
FIG. 2 illustrates a block diagram of an example system integrating the machine-learned model discussed herein and for training and/or refining such a model.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 802.11 standards, short range wireless frequencies such as ultra-high frequency (UHF) (e.g., Bluetooth®, satellite), cellular communication (e.g., 3G, 4G, 4G LTE, 5G, etc.), or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), tensor processing units (TPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, prediction component 230, planning component 232, machine-learned model 234, map data 236, simulation component 238, scenario(s) 240, vehicle trajectories 242, driver trajectories 244, training component 246, and/or system controller(s) 248 zero or more portions of any of which may be hardware, such as GPU(s), CPU(s), and/or other processing units. Perception component 228 may represent perception component 110, machine-learned model 234 may represent machine-learned model 112, and/or system controller(s) 248 may represent controller(s) 114. The memory 220 and/or 224 may additionally or alternatively store a mapping system, a planning system, a ride management system, etc.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment, such as map data 236, and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some examples, the localization component 226 may determine localization and/or mapping data comprising a pose graph (e.g., a sequence of position(s) and/or orientation(s) (i.e., pose(s)) of the vehicle 202 in space and/or time, factors identifying attributes of the relations therebetween, and/or trajectories of the vehicle for accomplishing those pose(s)), pose data, environment map including a detected static object and/or its distance from a pose of the vehicle 202, and/or the like In some instances, the localization component 226 may provide data to various components of the vehicle 202 to determine an initial position of an autonomous vehicle for generating a trajectory and/or for generating map data. In some examples, localization component 226 may provide, to the perception component 228, prediction component 230, and/or machine-learned model 234 a location and/or orientation of the vehicle 202 relative to the environment and/or sensor data associated therewith. For example, the output of the localization component 226 may be used as part of determining a vehicle state associated with the vehicle 202 that may be used by the machine-learned model 234 as part of the techniques discussed herein.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, acceleration, and/or other state associated with an object), and/or the like. The perception component 228 may include a prediction component that predicts actions/states of dynamic components of the environment, such as moving objects, although the prediction component may be separate, as in the illustration. In some examples, the perception component 228 may determine a top-down representation of the environment that encodes the position(s), orientation(s), velocity(ies), acceleration(s), and/or other states of the objects, map data, and/or general environment state data for the environment. For example, the top-down representation may be an image with additional data embedded therein, such as where various pixel channel values encode the perception data and/or map data discussed herein. Data determined by the perception component 228 is referred to as perception data.

The prediction component 230 may predict a future state of an object in the environment surrounding the vehicle 202. In some examples, the future (predicted) state may indicate a future position, orientation, velocity, acceleration, and or other state (e.g., door state, turning state) of the object. The predicted state may comprise a series of such states or a single such state. In some examples, the prediction component 230 may use an object detection and/or object track (or candidate object detection and/or virtual object track) to determine a predicted trajectory associated with the object or virtual object. Data determined by the prediction component 230 is referred to as prediction data. In some examples, the prediction component 230 may determine a top-down representation of a predicted future state of the environment. For example, the top-down representation may be an image with additional data embedded therein, such as where various channel pixel values encode the prediction data discussed herein.

The planning component 232 may receive a location and/or orientation of the vehicle 202 from the localization component 226, perception data from the perception component 228, and/or prediction data from the prediction component 230 and may determine instructions for controlling operation of the vehicle 202 based at least in part on any of this data. In some examples, the memory 220 may further store map data 236 and this map data may be retrieved by the planning component 232 as part of generating the top-down representation of the environment discussed herein. In some examples, determining the instructions may be based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212) that the drive component(s) 212 may parse/cause to be carried out, second instructions for the emitter(s) 208 may be formatted according to a second format associated therewith). In some examples, where the planning component 232 may comprise hardware/software-in-a-loop in a simulation (e.g., for testing and/or training the planning component 232), the planning component 232 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

In some examples, the map data 236 may comprise a two-dimensional or three-dimensional representation of the environment, characteristic(s) associated therewith, and/or embedding(s). A two-dimensional representation may include, for example, a top-down representation of the environment and a three-dimensional representation may comprise position, orientation, and/or geometric data (e.g., a polygon representation, a digital wire mesh representation). Either representation may comprise a label associated with a portion of the top-down representation indicating different characteristic(s) and/or feature(s) of the environment, such as the existence and/or classification of a static object (e.g., signage, mailboxes, plants, poles, buildings, and/or the like); areas of the environment relevant to the vehicle's operations (e.g., crosswalks, drivable surfaces/roadways, turning lanes, controlled intersections, uncontrolled intersections, sidewalks, passenger pickup/drop-off zones, and/or the like); a rule of the road associated with a portion of the map data; conditional lighting data depending on the time of day/year and/or the existence and location of light sources; object characteristics (e.g., material, refraction coefficient, opacity, friction coefficient, elasticity, malleability); occlusion data indicating portion(s) of the environment that are occluded to one or more sensors of the vehicle 202; and/or the like. The occlusion data may further indicate occlusions to different classes of sensors, such as portion(s) of the environment occluded to visible light cameras but not to radar or lidar, for example. The two-dimensional representation and/or three-dimensional representation may have embeddings associated therewith that encode this data via the learned process discussed herein. For example, for a three-dimensional representation of the environment comprising a mesh, an embedding may be associated with a vertex of the mesh that encodes data associated with a face that may be generated based on one or more vertices associated with the face. For a two-dimensional representation of the environment an edge or other portion of the top-down representation may be associated with an embedding.

In some examples, the machine-learned model 234 may be part of the planning component 232 or may replace the planning component 232 and prediction component 230. In some examples, where the machine-learned model 234 may comprise hardware/software-in-a-loop in a simulation (e.g., for testing, training, and/or refining the machine-learned model 234), the machine-learned model 234 may generate instructions (e.g., a trajectory) which may be used to control a simulated vehicle. The machine-learned model 234 may provide the trajectory as input to the simulation component 238 in some examples (e.g., to control a simulated representation of the vehicle 202 in a simulation executed by the simulation component 238).

In some examples, data received by the vehicle 202 and/or determined by the vehicle may be stored as log data. Log data may comprise sensor data, perception data, vehicle trajectories determined by the machine-learned model 234, and/or scenario labels collected/determined by the vehicle 202 (e.g., by the perception component 228), as well as any other message generated and or sent by the vehicle 202 during operation including, but not limited to, control messages, error messages, etc. In some examples, the vehicle 202 may transmit the log data to the computing device(s) 214. The vehicle 202 and/or the computing device(s) 214 may execute a pre-processing operation that include identifying different scenario(s) 240 from the log data and/or perception data associated therewith. A scenario may comprise an environment state data (e.g., four-way controlled intersection, three-way uncontrolled intersection, six-way atypical controlled intersection, two-lane highway, one-way direction of travel, lighting state, weather condition), object data (e.g., a number, type, and/or configuration of object(s) in the scenario, track(s) associated with the object(s)), and/or the like. The configuration may identify a position, orientation, and/or trajectory/velocity of the object(s). The techniques may comprise aggregating the log data and perception data associated with a same scenario from log data and perception data received from one or more autonomous vehicles over a data-gathering time period.

In some examples, the computing device(s) 214 may identify one or more scenarios based at least in part on the log data, which may also comprise defining a scenario. For example, the computing device(s) 214 may determine an environmental layout, a number, type, configuration, and/or track(s) of object(s) in the environment and/or associate this definition with one or more portions of log data associated with that scenario. Additionally or alternatively, some scenarios may be synthetically generated, such as by input via a user interface, by procedural generation, or by sampling a scenario space that defines different combinations of environment state and/or object data (see U.S. patent application Ser. No. 17/187,721, filed Feb. 26, 2021, the entirety of which is incorporated by reference herein for all purposes). In some examples, the log data may comprise (historical) perception data that was generated on the vehicle 102 during operation of the vehicle. In an additional or alternate example, the perception data may include perception data generated during a simulation. In some examples, the scenario may indicate characteristics of the environment such as, for example, a position, orientation, movement, and/or characteristics (e.g., materials, height, width, depth, luminance) of one or more objects. For example, the environment may comprise one or more static objects and/or one or more dynamic objects in a configuration specified by the scenario that is to be simulated. Movement of the dynamic object or changes in state of the environment may be defined by the scenario and may be altered in the simulation. In some examples, any of the dynamic objects or alterable elements of the environment instantiated (e.g., light states, draw bridge states, lane states) in the scenario may be controlled based at least in part on the output of the simulation component 238.

In some examples, a scenario label may be determined and associated with sensor data and/or perception data stored as part of the log data. The scenario label may characterize a number, type, configuration, and/or track of objects in the environment and/or a layout and/or state of the environment. In some examples, the scenario label may be a data structure. The configuration may define a position, heading, and/or velocity of an object in the environment and the layout of the environment may identify a general characterization of the environment (e.g., four-way light controlled intersection, four-way light-controlled intersection with uncontrolled left turn lane, three-way uncontrolled intersection with one-way road). In some examples, a scenario label may be generated as part of a log data processing operation. The processing operation may comprise determining sensor data associated with perception data that identifies a relative location and/or type of object. For example, the processing operation may identify a number and/or type of objects in the regions enumerated below and associating this data with the respective sensor data. The resulting metadata annotations may be clustered and a scenario label may be associated with each disparate cluster, which may be based on number and/or type of object and/or region. In some examples, clustering the metadata annotations may comprise using a Naïve Bayes classifier and/or support vector machine to determine keywords that may be similar to each other/associated with a same cluster. For other forms of data, such as a distance from a junction, a traffic light state, or a number of roadways associated with a junction, k-means may additionally or alternatively be used. In some examples, the clustering may be based at least in part on region in which an object exists relative to the vehicle 202.

In some examples, the scenario label may not be humanly comprehensible the scenario label may merely be a cluster identifier or embedding although in other examples, humanly comprehensible terms may be attached to the clusters (e.g., two objects to side of vehicle, one object in front of vehicle) and the like.

The simulation component 238 may determine a simulation of the environment, movement of any dynamic object(s), change(s) in environment state, and/or operations of the vehicle 202. For example, the simulation may comprise a representation of a position, orientation, movement, and/or quality of portions of the environment and/or the vehicle 202. The environment may comprise a dynamic object, such as another vehicle, a pedestrian, vegetation, signage, and/or the like. Simulation may be used to test operation of various components of the vehicle 202. In some examples, simulation may be used to test the machine-learned model 112 of the autonomous vehicle based at least in part on providing perception data from the simulation to the machine-learned model 112 and/or simulated sensor data to the perception component 228 for the perception component to generate perception data for input to the machine-learned model 112.

The simulation component 238 may receive scenario data to determine the simulation, which may be a two or three-dimensional representation of the scenario. For example, the three-dimensional representation may comprise position, orientation, geometric data (e.g., a polygon representation, a digital wire mesh representation) and/or movement data associated with one or more objects of the environment and/or may include material, lighting, and/or lighting data, although in other examples this data may be left out. In some examples, the scenario data may be procedurally generated as defined as part of a combinatorial iteration through scenarios, received responsive to interaction with a user interface of the computing device(s) 214 (e.g., responsive to user input), and/or the like, although in at least one example, the scenario data may be at least partially defined by a scenario of the scenario(s) 240.

The scenario data indicated by a scenario of the scenario(s) 240 may identify a position of an object, an area occupied by the object, a velocity and/or acceleration associated with the object, whether the object is static or dynamic, an object type associated with the object (e.g., a classification such as "pedestrian," "bicyclist," "vehicle," "oversized vehicle," "traffic light," "traffic signage," "building," "roadway," "crosswalk," "sidewalk"), and/or other kinematic qualities associated with the object and/or the object type (e.g., a friction coefficient, an elasticity, a malleability). As regards the environment itself, the scenario data may identify a topology of the environment, weather conditions associated with the environment, a lighting state (e.g., sunny, cloudy, night), a location of light sources, and/or the like. In some examples, topology, fixed object (e.g., buildings, trees, signage) locations and dimensions, and/or the like associated with the scenario data may be generated based at least in part on map data 236. In some examples, the scenario data may be used (e.g., by the simulation component 238) to instantiate a three-dimensional representation of the object and/or the simulated environment may be instantiated based at least in part on map data (e.g., which may define a topology of the environment; the location and/or dimensions of fixtures such as signage, plants, and/or buildings) and/or the scenario data.

In some examples, a simulated sensor may determine sensor data based at least in part on a simulation executed by the simulation component 238. For example, U.S. patent application Ser. No. 16/581,632, filed Sep. 24, 2019 and incorporated herein, discusses this in more detail. In an additional or alternate example, the simulation executed by the simulation component may itself comprise simulated sensor data. The perception component 228 (e.g., a copy thereof, which may comprise software and/or hardware, which may include hardware-in-the loop simulation) may receive such sensor data and/or simulated sensor data and may use it to determine perception data that is provided as input to the machine-learned model 234. The machine-learned model 234 may use the perception data to determine instructions for controlling motion of the vehicle 202, which may be used to control at least the simulated representation of the vehicle 202 in the simulation.

The instructions determined by the machine-learned model 234 for controlling the simulated vehicle during the simulation may be stored as part of the vehicle trajectories 242 in association with the scenario for which the machine-learned model 234 determined the instructions. In some examples, the vehicle trajectories 242 may comprise trajectories determined by the machine-learned model 234 during real-world operation of the vehicle 202 or during simulation. Accordingly, the memory 224 may store pairs of scenarios 240 with their respective vehicle trajectories 242, which may be real-world vehicle trajectories and/or simulated vehicle trajectories. Each scenario of the scenario(s) 240 may accordingly identify a set or series of vehicles trajectories that were output by the machine-learned model 234 in response to the scenario, although for simplicity the discussion herein refers to the one or more vehicle trajectories determined by the machine-learned model 234 responsive to a scenario as "a vehicle trajectory."

In some examples, a driver trajectory of the driver trajectories 244 may be determined based at least in part on capturing driver input to control the vehicle 202 or a simulated representation of the vehicle 202 responsive to a scenario. Similarly to the vehicle trajectories, the driver trajectory generated for a scenario may comprise one or more driver trajectories. For example, capturing the driver input may comprise sampling a state of driving controls used by a human user or computationally-complex machine-learned model to control the vehicle 202 or a simulated representation of the vehicle 202. This state may comprise, for example, a steering rate, steering angle, velocity, position, heading, and/or the like achieved by the human or advance machine-learned model controls supplied to control the vehicle 202 or simulated representation of the vehicle 202. In some examples, the driver trajectories 244 may additionally or alternatively include a trajectory that is drawn by a human user via a user interface or determined by a computationally-complex machine-learned model. As discussed above, the driver trajectories 244 may be generated as a driver (e.g., human or advanced machine-learned model) drives a real-world vehicle 202 or while the driver controls a simulated representation of the vehicle 202, like in a video game. For simulations where a human driver is supplying controls to a simulated representation of the vehicle 202, the human may be provided with controls suitable for operating the simulated representation and the simulation component 238 may provide output suitable for the human driver to be apprised of the scenario as it is simulated, such as displaying a view of the simulated scenario one or more displays, outputting audio via a speaker, and/or the like.

Once the driver trajectory (e.g., one or more driver trajectories) have been captured for a scenario, the driver trajectory and vehicle trajectory may be stored in association with the scenario. Accordingly, each scenario of the scenarios 240 may identify a vehicle trajectory and a driver trajectory. The training component 246 may determine, between a driver trajectory and a vehicle trajectory associated with a scenario, a preferred trajectory and a rejected trajectory. In some examples, the training component 246 may determine the preferred trajectory as being the driver trajectory (i.e., the training component may naively always select the driver trajectory as the preferred trajectory) and may determine a loss based at least in part on a difference between the preferred trajectory and the driver trajectory or the training component 246 may determine a reward/demerit for the trajectory determined by the machine-learned model 234 using a learned reward model. The learned reward model may be trained to determine a score (e.g., reward/demerit) for the trajectory determined by the machine-learned model 234 and this score may be used as a loss for training the machine-learned model 234.

For example, the training component 246 may determine performance metrics for the vehicle trajectories and performance metrics for the driver trajectories generated for a particular scenario. Such performance metrics may include, for example, safety metrics, progress metrics, and/or comfort metrics. Safety metrics could be based on a variety of data such as, how often the autonomous vehicle comes within a threshold distance of an object during the scenario, a minimum braking distance to avoid a nearest object during the scenario, maximum braking force to avoid a nearest object during the scenario, conformance to a rule of the road during the scenario, and/or the like. Progress metrics could be based on how far along a path or towards a target state the autonomous vehicle progresses in executing its operations. Comfort metrics could be based on data such as a lateral and/or longitudinal velocity, acceleration, and/or jerk associated with the autonomous vehicle's movements.

The training component 246 may use the performance metrics to train a learned reward model that determines an overall score associated with the vehicle trajectories and an overall score for the driver trajectories generated for a scenario. For example, the learned reward model may comprise the machine-learned model 234 with an output head that normally outputs a trajectory replaced with an output head that is trained to regress the score. This output head may comprise a linear model that predicts a scalar value instead and may be trained based at least in part on the performance metrics determined as discussed herein. For example, the learned reward model may be trained based at least in part on determining a difference between an output of the output head trained to regress the score and a performance metric. The difference may be used as a loss for use in backpropagation and gradient descent to alter parameters of the learned reward model to reduce the loss.

In an additional or alternate example, the training component 246 may determine the preferred trajectory using the metrics by determining which trajectory results in a greater score according to a hierarchical multi-objective optimization. For example, the hierarchical multi-objective optimization may break the score determination into different hierarchical levels in order of priority. For example, a first level of the hierarchical cost determination may be associated with object impact and/or safety of the vehicle, a second level may be associated with vehicle progress and/or passenger comfort, a third level may be associated with driving dynamics, and so on. Each level may be associated with one or more objectives and a particular objective may have one or more score functions associated therewith. For example, a safety objective may be associated with multiple different sub-scores that may be based at least in part on the proximity to an object that a vehicle/driver trajectory would bring the vehicle, minimum braking distance or maximum braking force to a nearest object, conformance to rules of the road, and/or the like. A passenger comfort objective may be associated with determining an acceleration or jerk associated with the vehicle/driver trajectory and/or one or more lateral and/or longitudinal velocity, acceleration, and/or jerk thresholds. A progress objective may be associated with determining how far along a path the vehicle/driver trajectory would bring the vehicle and a drive dynamics may be associated with how feasible the vehicle/driver trajectory would be for physical components of the vehicle in light of weather and/or lighting conditions.

The hierarchical multi-objective optimization may include determining first scores for vehicle/driver trajectories of a scenario using a first cost function (or multiple cost functions in examples where the first level is associated with multiple objectives). In some examples, for the first level, the techniques may determine which trajectory (between the vehicle trajectory and the driver trajectory) resulted in a highest score. For the second level, the techniques may include determining second scores for the vehicle/driver trajectories for the scenario using second cost function(s) that are associated with the second objective(s). This process may be repeated until a final level is reached. The hierarchical multi-objective optimization may then determine which trajectory (between the vehicle trajectory and the driver trajectory) resulted in the most high scores for the different levels and indicate that trajectory as being the preferred trajectory.

Once a preferred trajectory and rejected trajectory have been determined for each scenario, the training component 246 may refine the machine-learned model 234 based at least in part on these indications of which trajectory is preferred and which trajectory is rejected for each scenario. This refinement may include direct preference optimization that may be based at least in part on a difference between the preferred trajectory and the rejected trajectory or reinforcement learning that may be based at least in part on a score (i.e., reward/demerit) determined by the learned reward model. Determining the difference for direct preference optimization may comprise determining differences in position, heading, velocity, steering angle, or the like at corresponding times along the preferred trajectory and the driver trajectory. A spatial difference may be broken into latitudinal and longitudinal differences. The differences may be indicated as a vector, having magnitude and direction, as opposed to merely being a magnitude. Regardless, the differences between the preferred trajectory and the rejected trajectory may then be normalized (e.g., scaled) based at least in part on the differences determined for other preferred trajectory-rejected trajectory pairs in a batch of scenarios to ensure they're compress to a same relative space. The normalized differences may then be weighted such that earlier differences in time have a higher weight than later differences in time (e.g., using exponential weights, such as assigning a weight of $0.9^n$ to a difference, where n is the number of time steps from a beginning of the scenario).

For direct preference optimization, the weighted and normalized differences may be used as part of determining a loss, which may be further based at least in part on additional weights. These additional weights may include a first weight for the preferred trajectory that may be greater than a second weight for the rejected trajectory. For reinforcement learning, a reward may be determined by a learned reward model for the trajectory output by the machine-learned model 234. In some examples, a demerit may also be determined by the learned reward model for the rejected trajectory, but in other examples, just a reward may be determined for the trajectory output by the machine-learned model 234. The learned reward model may be trained to determine the reward and/or demerit based at least in part on the performance metrics and/or scores as discussed above. In some examples, the reinforcement learning may additionally use the differences between the preferred trajectory and the rejected trajectory as part of determining the reward and/or the demerit.

Regardless of whether direct preference optimization or reinforcement learning is used, the training component 246 may use either method to refine the machine-learned model 234 may include altering one or more parameters of the machine-learned model 234 to reduce the loss (for direct preference optimization) or to increase the reward/decrease the demerit determined as part of reinforcement learning.

The simulation component 238 may provide a safe and expeditious way of testing how the machine-learned model 234 reacts to various scenarios that the vehicle 202 may or may not have encountered during operation, determining whether or not the machine-learned model 234 generates safe and/or efficacious control instructions to navigate the scenarios, and/or determining whether a version update to the machine-learned model 234 progressed, maintained, or regressed performance metric(s) associated with operation of the vehicle 202.

In some examples, the simulation component 238 may additionally or alternatively store a ruleset and may determine whether the planning component 230 passed or failed a scenario based at least in part on the ruleset. The ruleset may be associated with and/or include operating constraint(s) or performance metric threshold(s). In some examples, the simulation component 238 may record a version of the machine-learned model 234 in association with a scenario identifier and/or an indication of whether the vehicle trajectory generated by the machine-learned model 234 passed or failed the scenario. In an additional or alternate example, the simulation component 238 may determine a non-binary (e.g., continuous value) indication associated with performance of the machine-learned model 234 (e.g., a score in addition to or instead of a pass/fail indication, such as the reward, demerit, or scores discussed above). The non-binary indication may be based at least in part on a set of weights associated with the ruleset. In some examples, the ruleset may be part of or replaced by an event detection system (see U.S. patent application Ser. No. 16/682,971, filed Nov. 13, 2019, the entirety of which is incorporated by reference herein for all purposes). The simulation component 238 may additionally or alternatively indicate that the machine-learned model 234 is certified for transmission to the vehicle 202 and use by the vehicle 202 if an average or sum of the performance metrics associated with the vehicle trajectories for all the scenarios 240 meets or exceeds a threshold performance metric and/or if the number of scenarios for which the vehicle trajectories failed was below a threshold number or percentage of the scenarios 240; otherwise, the simulation component 238 may indicate that the machine-learned model 234 is not certified and may prevent transmission of the machine-learned model 234 to the vehicle 202.

In some examples, the machine-learned model 234 may output the trajectory determined by the machine-learned model 234 to the planning component 232. In such an example, the planning component 232 may alter or refine the trajectory before transmitting a refined trajectory to the system controller(s) 248 for implementation by the vehicle.

As described herein, the localization component 226, the perception component 228, the prediction component 230, the planning component 232, machine-learned model 234, training component 246, and/or other components of the system 200 may each comprise one or more ML models. For example, localization component 226, the perception component 228, the prediction component 230, the planning component 232, and/or the machine-learned model 234 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Any type of machine-learning can be used consistent with this disclosure. For example, machine-learning models can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, U-net, EfficientDet, and the like; visual transformer(s) (ViT(s)), such as a bidirectional encoder from image transformers (BEiT), visual bidirectional encoder from transformers (VisualBERT), image generative pre-trained transformer (Image GPT), data-efficient image transformers (DeiT), deeper vision transformer (DeepViT), convolutional vision transformer (CvT), SwinV2-Base, CLIP ViT-Base, SwinV2-Tiny, DINO ViT-Small, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. Pat. No. 10,649,459, filed Apr. 26, 2018, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 248 (which may be a portion of the drive component(s)), which may be configured to control steering, propulsion, braking, safety, emitters, communication, and other systems of the vehicle 202. These system controller(s) may communicate with and/or control corresponding systems of the drive component(s) 212 and/or other components of the vehicle 202. For example, the machine-learned model 234 may generate a trajectory comprising instructions based at least in part on perception data generated by the perception component 228 and transmit the trajectory to the system controller(s) 248, which may control operation of the vehicle 202 based at least in part on the trajectory.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Scenario

Figure 3B:
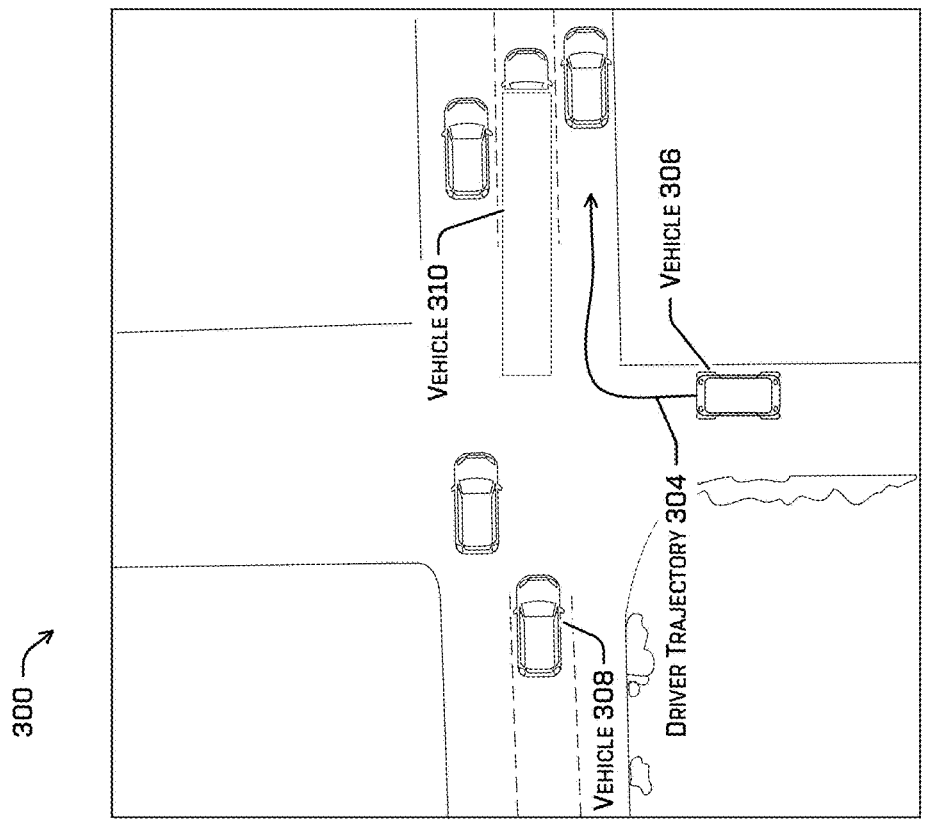
FIGS. 3A and 3B illustrate an example scenario for which a vehicle trajectory and driver trajectory have been generated, one of which may be classified as a preferred trajectory and the other of which may be classified as a rejected trajectory.
Figure 3A:
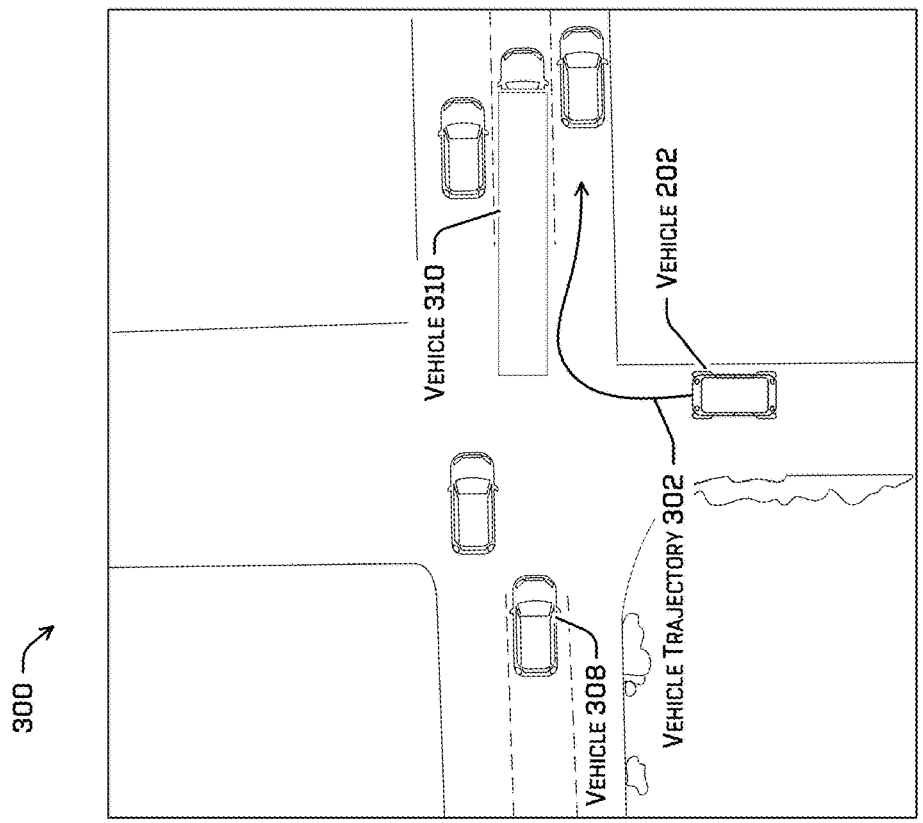

FIGS. 3A and 3B illustrate an example scenario 300 for which a vehicle trajectory and driver trajectory have been generated, one of which may be classified as a preferred trajectory and the other of which may be classified as a rejected trajectory according to the techniques discussed herein. As discussed above and as indicated in FIG. 3A, the machine-learned model 234 of the vehicle 202 may generate the vehicle trajectory 302 as part of real-world operation of the vehicle 202 or simulated operation of the vehicle during a simulation of the example scenario 300. The machine-learned model 234 may output the vehicle trajectory 302 based at least in part on perception data generated by the perception component responsive to sensor data received by the perception component as the vehicle 202 operates during the scenario.

A driver (e.g., a human or computationally-complex machine-learned model) may generate the driver trajectory 304 as part of operating a vehicle 306 responsive to the example scenario 300. In some examples driver operation of the vehicle 306 may include operating a real-world vehicle, teleoperator control of vehicle 202 in a real-world scenario, or control of a simulated representation of vehicle 202. Regardless, the driver trajectory 304 and the vehicle trajectory 302 achieved in example scenario 300 are different. In some examples, the driver trajectory 304 may be classified as being the preferred trajectory by virtue of being human-generated or based on a score determined for the driver trajectory 304 based at least in part on performance metrics determined in association with the driver trajectory 304 being greater than a score determined for the vehicle trajectory 302. The lower score for the vehicle trajectory 302 may result from the vehicle 202 not turning tightly enough to account for the oncoming vehicle 308 and/or operating too closely to vehicle 310, which may have moved some by the time the vehicle 202 reaches the apex of the turn but may nonetheless violate a proximity threshold. The example scenario 300, vehicle trajectory 302, and driver trajectory 304 are further discussed in FIG. 4.

Note that, by using simulated scenarios, exact replication of the example scenario 300 is achievable, which may increase the precision and recall that results from refining the machine-learned model 234 using preference classification between the vehicle trajectory 302 and the driver trajectory 304 sine the scenario may be nearly identical, except for the responses of dynamic object(s) in the environment to the vehicle trajectory or driver trajectory.

Example Process

Figure 4:
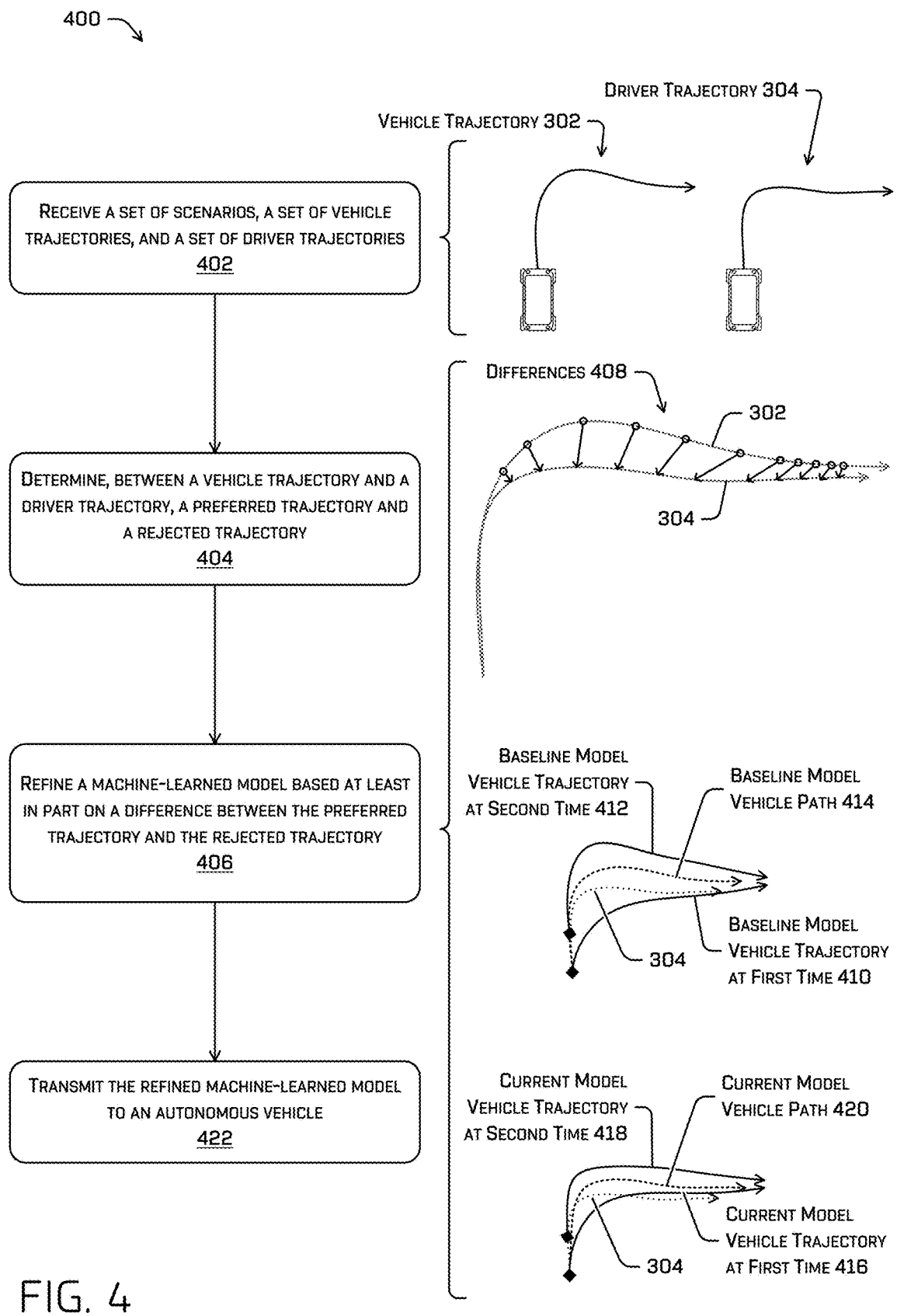
FIG. 4 depicts a pictorial flow diagram of an example process for refining a machine-learned model using a preferred trajectory determined between a vehicle trajectory and a driver trajectory.

FIG. 4 depicts a pictorial flow diagram of an example process 400 for refining the machine-learned model 234 using a preferred trajectory determined between a vehicle trajectory and a driver trajectory. In some examples, example process 400 may be executed by computing device(s) 214 and the refined machine-learned model may be transmitted to the vehicle 202 for installation and for the vehicle 202 to use as part of controlling operations of the vehicle 202.

At operation 402, example process 400 may comprise receiving a set of scenarios, a set of vehicle trajectories, and a set of driver trajectories, according to any of the techniques discussed herein. The set of scenarios may comprise a scenario that is a digital representation of sensor and/or perception data determined by a vehicle as part of operating. Additionally or alternatively, the scenario may be a digital representation of a synthetically-generated scenario, such as a user-defined scenario or a programmatically-generated scenario, such as by procedural generation or by sampling a scenario space that defines different combinations of environment state, vehicle state, and/or object data (see U.S. patent application Ser. No. 17/187,721, filed Feb. 26, 2021, the entirety of which is incorporated by reference herein for all purposes). Each scenario may be associated with a vehicle trajectory and a driver trajectory generated for the scenario. FIG. 4 depicts vehicle trajectory 302 and driver trajectory 304 as an example. Vehicle trajectory 302 and driver trajectory 304 may be associated with the example scenario 300 depicted in FIG. 3.

The machine-learned model 234 may generate a vehicle trajectory based at least in part on perception data, such as simulated perception data, perception data determined as part of a simulation, or perception data from log data associated with the scenario. The machine-learned model 234 may be trained to use the perception data to output the vehicle trajectory. In some examples, the vehicle trajectory associated with a scenario may comprise one or more vehicle trajectories, although for simplicity, these one or more vehicle trajectories are referred to herein as a vehicle trajectory.

As discussed above, the driver trajectory may be captured from human input to drive controls to control the vehicle or a simulation of the vehicle or generated by a computationally-complex machine-learned model that may require more computational processing than is feasible for implementation by the vehicle 202. In some examples, the set of scenarios, set of vehicle trajectories, and set of driver trajectories may be part of a respective superset of scenarios, superset of vehicle trajectories, and superset of driver trajectories. In such an example, the set of scenarios, set of vehicle trajectories, and set of driver trajectories may be considered a subset of their respective set. Moreover, in such an example, the subsets may be determined based at least in part on performance metric(s) and/or score(s) determined for the vehicle trajectories. For example, operation 402 may comprise the sets by determining a set of vehicle trajectories for which performance metric(s) and/or score(s) were below a threshold performance metric and/or threshold score and the scenarios and driver trajectories associated therewith. In such a manner, the example process 400 may refine the machine-learned model 234 for scenarios in which the machine-learned model 234 operated insufficiently or was indicated as failing. In some examples, the set of vehicle trajectories may additionally include a percentage of the vehicle trajectories for scenarios in which the vehicle trajectories passed the scenario by having performance metric(s) and/or score(s) that meet or exceed the performance metric threshold and/or score threshold. This may ensure that refining the machine-learned model 234 doesn't regress the machine-learned model 234's performance on scenarios for which the vehicle previously performed sufficiently.

At operation 404, example process 400 may comprise determining, for a set of trajectories, such as between a vehicle trajectory and a driver trajectory for a scenario, a preferred trajectory and a rejected trajectory, according to any of the techniques discussed herein. In some examples, the preferred trajectory may be determined to be the driver trajectory. In other examples, the preferred trajectory may be determined based at least in part on determining, by the learned reward model, a score associated with the vehicle trajectory and a score associated with the driver trajectory and classifying one of these trajectories as the preferred trajectory based on which score is greater. Additionally or alternatively, in a reinforcement learning example, the preferred trajectory may indicated to be the driver trajectory, which may be used as part of determining a reward/demerit by the learned reward model to refine the machine-learned model.

In some examples, the learned reward model may be trained based at least in part on performance metrics determined for a scenario. For example, the training component 246 may determine performance metrics for the vehicle trajectories and performance metrics for the driver trajectories generated for a particular scenario. Such performance metrics may include, for example, safety metrics, progress metrics, and/or comfort metrics. Safety metrics could be based on a variety of data such as, how often the autonomous vehicle comes within a threshold distance of an object during the scenario, a minimum braking distance to avoid a nearest object during the scenario, maximum braking force to avoid a nearest object during the scenario, conformance to a rule of the road during the scenario, and/or the like. Progress metrics could be based on how far along a path or towards a target state the autonomous vehicle progresses in executing its operations. Comfort metrics could be based on data such as a lateral and/or longitudinal velocity, acceleration, and/or jerk associated with the autonomous vehicle's movements. The learned reward model may comprise the machine-learned model 234 discussed herein with the output head(s) that normally output a trajectory being replaced with a linear regression output head that may be trained to output the score. For example, the learned reward model may be trained based at least in part on determining a difference between an output of such a head determined for a trajectory and a performance metric determined for that trajectory. The difference may then be used, via gradient descent, to alter parameter(s) of the learned reward model to reduce the difference.

At operation 406, example process 400 may comprise refining the machine-learned model based at least in part on a difference between the preferred trajectory and the rejected trajectory, according to any of the techniques discussed herein. This refinement may include direct preference optimization that may be based at least in part on a difference between the preferred trajectory and the rejected trajectory or reinforcement learning that may be based on a score (e.g., a reward/demerit) determined by the learned reward model. For example, determining the difference may comprise determining differences in position, heading, velocity, or the like at corresponding times along the preferred trajectory and the driver trajectory. A spatial difference may be broken into latitudinal and longitudinal differences. For example, FIG. 4 depicts such differences 408 as arrows originating from respective states indicated by the rejected trajectory (e.g., the vehicle trajectory 302) to states indicated by the driver trajectory 304 at the same respective times. Note that the vehicle trajectory 302 may indicate a slightly faster velocity, as shown by the skew between the positions at a same point in time in the scenario. Regardless, the differences between the preferred trajectory and the rejected trajectory may be normalized (e.g., scaled) based at least in part on the differences determined for other preferred trajectory-rejected trajectory pairs in a batch of scenarios to ensure they're compress to a same relative space. The normalized differences may then be weighted such that earlier differences in time have a higher weight than later differences in time (e.g., using exponential weights, such as assigning a weight of $0.9^n$ to a difference, where n is the number of time steps from a beginning of the scenario, and/or by mapping the weighted differences to a logarithmic parameterized space). Note that although FIG. 4 depicts a difference as a spatial difference in x- and y-position of the vehicle indicated by the preferred and rejected trajectories, a difference may additionally or alternatively include a difference in velocity, steering angle, and/or heading of the vehicle indicated by the vehicle trajectory 302 and the driver trajectory 304. The weighted and normalized differences may be used as part of determining a loss, which may be further based at least in part on additional weights. These additional weights may include a first weight for the preferred trajectory that may be greater than a second weight for the rejected trajectory.

More specifically, determining the loss using direct preference optimization refinement of the machine-learned model for a particular scenario may be based at least in part on determining differences between a driver trajectory, a vehicle trajectory output by a baseline machine-learned model, and a vehicle trajectory output by a current machine-learned model. The baseline machine-learned model may be a previous version of the machine-learned model whose parameters are frozen (e.g., the weights and/or biases of the machine-learned model are not updated as part of the refinement operation 406) and the current machine-learned model may be the machine-learned model that is being refined at operation 406. Moreover, determining the loss for a scenario using direct preference optimization may additionally or alternatively be based on the following trajectories:

The driver trajectory 304 over the length of the scenario (i.e., driver path);
The baseline model's planned vehicle trajectories at discrete points in time over the scenario (e.g., baseline vehicle trajectory at first time 410, baseline vehicle trajectory at second time 412);
The vehicle trajectory the baseline model actually implemented over the scenario (i.e., baseline vehicle path 414);
The current model's planned vehicle trajectories at discrete points in time over the scenario (e.g., current vehicle trajectory at first time 416, current vehicle trajectory at second time 418); and The vehicle trajectory the current model actually executed over the scenario (i.e., current model vehicle path 420);

The baseline and current machine-learned models may be configured to generate a vehicle trajectory (e.g., controls sufficient to control the for a duration of time from a time tick up to a horizon time, e.g., 5 seconds, 8 seconds) at regular time intervals (e.g., ever 0.1 seconds, every 0.5 seconds, every 1 second, or the like). In other words, at each time interval, either machine-learned model may generate a vehicle trajectory for controlling the vehicle for a duration of time (e.g., 2 seconds, 5 seconds, 8 seconds, 10 seconds into the future from the time tick). For example, at a first time either model may generate a first vehicle trajectory for controlling the vehicle for the next 5 seconds from the first time, at a second time either model may generate a second vehicle trajectory for controlling the vehicle for the next 5 seconds from the second time, and so on until the scenario has ended. In other words, the scenario may be m seconds long and either machine-learned model may generate a vehicle trajectory for controlling the vehicle or simulated vehicle over the next n seconds and may generate such a vehicle trajectory every k seconds, where k, m, and n are positive numbers, k is less than n, and n may be less than, equal to, or greater than m. Such a vehicle trajectory may be provided to a planning component of the vehicle for adjustment and/or implementation by the vehicle or simulated vehicle. However, since a newly generated vehicle trajectory will be generated at the next time interval, the next vehicle trajectory may differ from the last vehicle trajectory generated by either model. Accordingly, the path the vehicle or simulated vehicle ends up taking may be different than any of the trajectories generated by the model from a beginning to an end of the scenario. To distinguish between the trajectory actually accomplished by the vehicle or simulated vehicle during the scenario, this may be referred to as the path taken during the scenario or the trajectory over the scenario, whereas the trajectory predicted by one of the models at a particular point in time in the scenario may be referred to as the vehicle trajectory at some time. In some examples, the driver trajectory may be a path since intermediate predictions of the driver path may not be available if a human operated the vehicle or simulated vehicle during the scenario.

Accordingly, determining the loss for the scenario using direct preference optimization may comprise determining four sub-losses for each time interval at which a vehicle trajectory was generated and determining the loss based at least in part on averaging or otherwise aggregating the four sub-losses over all the time intervals for the whole scenario. Moreover, in an example where the machine-learned model comprises a mixture of experts where each expert comprises an output head or other output component of the machine-learned model that output a candidate vehicle trajectory before a final output head determines one of the multiple candidate vehicle trajectories to output as the vehicle trajectory, a loss may be determined for up to each expert and/or for the final output head.

Determining the four sub-losses for a particular time in the scenario may comprise: (1) determining a difference between the current model's vehicle trajectory generated at the particular time and the driver trajectory/path (e.g., determining a difference between the current model vehicle trajectory at first time 416 and the driver trajectory 304); (2) determining a difference between the current model's vehicle trajectory generated at the particular time and the vehicle path actually driven by the vehicle once all the vehicle trajectories have been generated by the current model for the scenario (e.g., determining a difference between the current model vehicle trajectory at first time 416 and the current model vehicle path 420); (3) determining a difference between the baseline model's vehicle trajectory generated at the particular time and the driver trajectory/path (e.g., determining a difference between the baseline model vehicle trajectory at first time 410 and the driver trajectory 304); and (4) determining a difference between the baseline model's vehicle trajectory generated at the particular time and the vehicle path actually driven by the vehicle once all the vehicle trajectories have been generated by the baseline model for the scenario (e.g., determining a difference between the baseline model vehicle trajectory at first time 410 and the baseline model vehicle path 414). Such differences may be determined according to the discussion of the differences 408 above. For example, a difference as described above may include determining one or more differences in position, velocity, steering angle, and/or heading of the vehicle indicated at a point along the respective trajectory or path from a time associated with a beginning of the trajectory to a time associated with an end of the trajectory.

A first intermediate loss and a second intermediate loss may then be determined using the four sub-losses. Determining the first intermediate loss may comprise determining the difference between the logarithm of the first sub-loss (1) and the logarithm of the second sub-loss (2) and determining the second intermediate loss may comprise determining the difference between the logarithm of the third sub-loss (3) and the logarithm of the fourth sub-loss (4). In other words, determining the first intermediate loss may comprise determining a logarithmic difference between the error between the current model's vehicle trajectory for the particular time and the driver trajectory and the error between the current model's vehicle trajectory for the particular time and the vehicle path accomplished by the current model; and determining the second intermediate loss may comprise determining a logarithmic difference between the error between the baseline model's vehicle trajectory for the particular time and the driver trajectory and the error between the baseline model's vehicle trajectory for the particular time and the vehicle path accomplished by the baseline model. In some examples, the logarithm of the sub-losses may be determined using an element-wise natural logarithm.

The loss for the particular time may then be determined based at least in part on determining the negative of the logarithm of the difference between the first intermediate loss and the second intermediate loss. In some examples, the logarithm of the difference between the intermediate losses may be determined using an element-wise log sigmoid. The difference between the first intermediate loss and the second intermediate loss may indicate a log ratio of improvement or regression of the current machine-learned model's performance on the scenario to the baseline machine-learned model's performance on the scenario at the particular time. Such a loss may be determined for each time interval at which a vehicle trajectory was generated during the scenario and these losses may individually be used to refine the current machine-learned model (e.g., by altering one or more parameters, such as weight(s) and/or bias(es), of the current machine-learned model to reduce each loss associated with the different time intervals individually) or the losses may be aggregated together (e.g., averaging, softmax) and used to refine the current machine-learned model (e.g., by altering one or more parameters of the current machine-learned model to reduce the aggregated loss).

Moreover, as discussed above, for a mixture of experts type machine-learned model, this process may be repeated for each candidate vehicle trajectory generated by an expert (i.e., intermediate output head) and/or for the vehicle trajectory output by the final output head that selects from the candidate trajectories output by the experts.

For reinforcement learning, a reward may be determined by a learned reward model for the vehicle trajectory. In some examples, the reward may be positive (i.e., a reward to reinforce a vehicle trajectory) or negative (i.e., a demerit to alter the model to disincentivize generating such a vehicle trajectory for that scenario). The reward may also be determined by the learned reward model for the rejected trajectory, but in other examples, just a reward may be determined for the preferred trajectory. The learned reward model may be trained to determine the reward based at least in part on the performance metrics and/or scores discussed above. In some examples, the reinforcement learning may additionally use the differences between the preferred trajectory and the rejected trajectory as part of determining the reward and/or the demerit. In an example where reinforcement learning is used, the reward/score may be used as a loss for backpropagation and altering one or more parameters of the machine-learned model to reduce the loss according to a gradient descent algorithm.

Regardless of whether direct preference optimization or reinforcement learning is used, refining the machine-learned model 234 may comprise altering one or more parameters of the machine-learned model 234 to reduce the loss (for direct preference optimization) or to increase the reward/decrease the demerit determined as part of reinforcement learning.

The example process 400 may repeat this alteration for all the trajectories associated with scenarios in the set of scenarios or until an average performance metric meets or exceeds a threshold performance metric or a count of failed scenarios is below a threshold count based at least in part on re-generating a vehicle trajectory for a scenario using the altered machine-learned model.

In some examples, the machine-learned model 234 may be trained to determine a set of candidate trajectories using the perception data and/or sensor data and may select one of the candidate trajectories for output. In some examples, the machine-learned model 112 may do this without determining a probability distribution over the candidate trajectories and may be trained to select one of the multiple candidate trajectories for output.

At operation 422, example process 400 may comprise transmitting the refined machine-learned model to an autonomous vehicle, according to any of the techniques discussed herein. Operation 422 may comprise streaming or transmitting the machine-learned model 234 to the vehicle 202 for the vehicle 202 to install the machine-learned model 234 for use as part of operating the vehicle 202. For example, the vehicle 202 may receive sensor data, determine perception data by a perception component of the vehicle, and determine a trajectory for controlling the vehicle based at least in part on providing the sensor data and/or perception data as input to the machine-learned model 234.

Example Clauses

A: A system comprising: one or more processors; and non-transitory memory storing processor-executable instructions that, when executed by the one or more processors, cause the system to perform operations comprising: receiving a scenario indicating at least one of environment state data and object detection data, a set of vehicle trajectories, a vehicle path that an autonomous vehicle executed based at least in part on the set of vehicle trajectories, and a driver trajectory executed by a human controlling a vehicle, wherein a vehicle trajectory of the set of vehicle trajectories is generated at a discrete time interval by a machine-learned model as part of controlling the autonomous vehicle during the scenario; determining, between two trajectories associated with a scenario comprising a first vehicle trajectory of the set of vehicle trajectories and the driver trajectory, one of the two trajectories as a preferred trajectory and the other of the two trajectories as a rejected trajectory, wherein the first vehicle trajectory indicates predicted controls to operate the vehicle over a time horizon during the scenario; determining a first intermediate loss based at least in part on: determining a first difference between the first vehicle trajectory and the vehicle path indicating a state of the vehicle according to output of the machine-learned model during the scenario; determining a second difference between the preferred trajectory and the first vehicle trajectory; altering, as a refined machine-learned model, one or more parameters of the machine-learned model based at least in part on the first intermediate loss; and transmitting the refined machine-learned model to the autonomous vehicle such that the autonomous vehicle is controlled based at least in part on an output of the refined machine-learned model.

B: The system of paragraph A, wherein altering the one or more parameters of the machine-learned model comprises: determining, by a learned reward model, a reward based at least in part on the difference and the preferred trajectory and a demerit based at least in part on the difference and the rejected trajectory instead of determining the first intermediate loss; and altering, by reinforcement learning based at least in part on the reward and the demerit, the one or more parameters to increase a likelihood that the machine-learned model will generate the preferred trajectory and decrease the likelihood that the machine-learned model will generate the rejected trajectory.

C: The system of paragraph B, wherein training the learned reward model comprises: replacing, as the learned reward model, at least one of an output head or an intermediate output head of the machine-learned model with a single output head that outputs a regressed value indicating a value that is used as the reward or the demerit; generating, by the learned reward model and based at least in part on at least one of the first vehicle trajectory or the vehicle path, an estimated reward or demerit; determining, by a ruleset and based at least in part on at least one of the first vehicle trajectory or the vehicle path, a performance metric indicating a level of at least one of performance, comfort, or safety associated with at least one of the first vehicle trajectory or the vehicle path; and altering a parameter of the learned reward model, including the single output head, based at least in part on a difference between the performance metric and the estimated reward or demerit.

D: The system of any one of paragraphs A-C, wherein: determining the first intermediate loss comprises determining a third difference between the first difference and the second difference; altering the parameter of the machine-learned model is based at least in part on determining a trajectory loss using the first intermediate loss and a second intermediate loss such that the trajectory loss is reduced; determining the second intermediate loss comprises: determining a fourth difference between a previous vehicle trajectory and a previous vehicle path, wherein the previous vehicle trajectory is generated by a previous version of the machine-learned model for the scenario and the previous vehicle path indicates a state of the vehicle according to output of the previous version of the machine-learned model during the scenario; determining a fifth difference between the previous vehicle trajectory and the preferred trajectory; and determining the second intermediate loss based at least in part on a sixth difference between the fourth difference and the fifth difference; and determining the trajectory loss comprises determining a seventh difference between the first intermediate loss and the second intermediate loss.

E: The system of paragraph D, wherein: the trajectory loss is a first trajectory loss associated with the first vehicle trajectory and the first vehicle trajectory was generated at a first time in the scenario; altering the parameter of the machine-learned model is based at least in part on determining a final loss using the first trajectory loss and a second trajectory loss; the second trajectory loss is determined based at least in part on a second vehicle trajectory of the set of vehicle trajectories associated with the scenario and the second vehicle trajectory was generated at a second time in the scenario later than the first time; and determining the final loss is based at least in part on: scaling the first trajectory loss using a first weight; and scaling the second trajectory loss using a second weight that is less than the first weight based at least in part on the second time being later than the first time.

F: The system of any one of paragraphs A-E, wherein: the set of vehicle trajectories is part of a superset of vehicle trajectories associated with multiple scenarios; the operations further comprise determining that the set of vehicle trajectories are associated with a score that is below a score threshold; and determining the score is based at least in part on determining at least one of a safety cost, progress cost, or comfort cost associated with a set of vehicle trajectories.

G: One or more non-transitory computer-readable media storing processor-executable instructions that, when executed by one or more processors, perform operations comprising: receiving a scenario, a set of vehicle trajectories, a vehicle path that a autonomous vehicle executed based at least in part on the set of vehicle trajectories, and a driver trajectory executed by a human controlling a vehicle, wherein a vehicle trajectory of the set of vehicle trajectories is generated by a machine-learned model as part of controlling the autonomous vehicle during the scenario; determining, between two trajectories associated with a scenario comprising a first vehicle trajectory of the set of vehicle trajectories and the driver trajectory, one of the two trajectories as a preferred trajectory and the other of the two trajectories as a rejected trajectory, wherein the first vehicle trajectory indicates predicted controls to operate the vehicle over a time horizon during the scenario; determining a first intermediate loss based at least in part on: determining a first difference between the first vehicle trajectory and the vehicle path; determining a second difference between the preferred trajectory and the first vehicle trajectory; and altering, as a refined machine-learned model, one or more parameters of the machine-learned model based at least in part on the first intermediate loss.

H: The one or more non-transitory computer-readable media of paragraph G, wherein altering the one or more parameters of the machine-learned model comprises: determining, by a learned reward model, a reward based at least in part on the difference and the preferred trajectory and a demerit based at least in part on the difference and the rejected trajectory instead of determining the first intermediate loss; and altering, by reinforcement learning based at least in part on the reward and the demerit, the one or more parameters to increase a likelihood that the machine-learned model will generate the preferred trajectory and decrease the likelihood that the machine-learned model will generate the rejected trajectory.

I: The one or more non-transitory computer-readable media of paragraph H, wherein training the learned reward model comprises: replacing, as the learned reward model, at least one of an output head or an intermediate output head of the machine-learned model with a single output head that outputs a regressed value indicating a value that is used as the reward or the demerit; generating, by the learned reward model and based at least in part on at least one of the first vehicle trajectory or the vehicle path, an estimated reward or demerit; determining, by a ruleset and based at least in part on at least one of the first vehicle trajectory or the vehicle path, a performance metric indicating a level of at least one of performance, comfort, or safety associated with at least one of the first vehicle trajectory or the vehicle path; and altering a parameter of the learned reward model, including the single output head, based at least in part on a difference between the performance metric and the estimated reward or demerit.

J: The one or more non-transitory computer-readable media of any one of paragraphs G-I, wherein determining the first intermediate loss comprises determining a third difference between the first difference and the second difference.

K: The one or more non-transitory computer-readable media of paragraph J, wherein: altering the parameter of the machine-learned model is based at least in part on determining a trajectory loss using the first intermediate loss and a second intermediate loss such that the trajectory loss is reduced; determining the second intermediate loss comprises: determining a fourth difference between a previous vehicle trajectory and a previous vehicle path, wherein the previous vehicle trajectory is generated by a previous version of the machine-learned model for the scenario and the previous vehicle path indicates a state of the vehicle according to output of the previous version of the machine-learned model during the scenario; determining a fifth difference between the previous vehicle trajectory and the preferred trajectory; and determining the second intermediate loss based at least in part on a sixth difference between the fourth difference and the fifth difference; and determining the trajectory loss comprises determining a seventh difference between the first intermediate loss and the second intermediate loss.

L: The one or more non-transitory computer-readable media of paragraph K, wherein: determining the first intermediate loss further comprises determining the third difference between a logarithm of the first difference and a logarithm of the second difference; determining the second intermediate loss further comprises determining the sixth difference between a logarithm of the fourth difference and a logarithm of the fifth difference; and determining the trajectory loss comprises determining the seventh difference between a logarithm of the first intermediate loss and a logarithm of the second intermediate loss.

M: The one or more non-transitory computer-readable media of either paragraph K or L, wherein: the trajectory loss is a first trajectory loss associated with the first vehicle trajectory and the first vehicle trajectory was generated at a first time in the scenario; altering the parameter of the machine-learned model is based at least in part on determining a final loss using the first trajectory loss and a second trajectory loss; the second trajectory loss is determined based at least in part on a second vehicle trajectory of the set of vehicle trajectories associated with the scenario and the second vehicle trajectory was generated at a second time in the scenario later than the first time; and determining the final loss is based at least in part on: scaling the first trajectory loss using a first weight; and scaling the second trajectory loss using a second weight that is less than the first weight based at least in part on the second time being later than the first time.

N: The one or more non-transitory computer-readable media of any one of paragraphs G-M, wherein determining at least one of the first difference or the second difference comprises: determining a first set of differences in position, heading, velocity, or steering angle indicated by trajectories for which the first difference or the second difference is being determined; normalizing, as a normalized difference, the first set of differences based at least in part on a second set of differences determined for a second scenario and other trajectories associated with the second scenario; and weighting, as a weighted difference, the normalized difference based at least in part on a displacement along the rejected trajectory.

O: The one or more non-transitory computer-readable media of any one of paragraphs G-N, wherein the vehicle is either a real vehicle or a simulated vehicle and the machine-learned model is trained to generate a trajectory for controlling the vehicle using at least one of sensor data or perception data that is determined based at least in part on the sensor data.

P: A method comprising: receiving a scenario, a set of vehicle trajectories, a vehicle path that a autonomous vehicle executed based at least in part on the set of vehicle trajectories, and a driver trajectory executed by a human controlling a vehicle, wherein a vehicle trajectory of the set of vehicle trajectories is generated by a machine-learned model as part of controlling the autonomous vehicle during the scenario; determining, between two trajectories associated with a scenario comprising a first vehicle trajectory of the set of vehicle trajectories and the driver trajectory, one of the two trajectories as a preferred trajectory and the other of the two trajectories as a rejected trajectory, wherein the first vehicle trajectory indicates predicted controls to operate the vehicle over a time horizon during the scenario; determining a first intermediate loss based at least in part on: determining a first difference between the first vehicle trajectory and the vehicle path; determining a second difference between the preferred trajectory and the first vehicle trajectory; and altering, as a refined machine-learned model, one or more parameters of the machine-learned model based at least in part on the first intermediate loss.

Q: The method of paragraph P, wherein altering the one or more parameters of the machine-learned model comprises: determining, by a learned reward model, a reward based at least in part on the difference and the preferred trajectory and a demerit based at least in part on the difference and the rejected trajectory instead of determining the first intermediate loss; and altering, by reinforcement learning based at least in part on the reward and the demerit, the one or more parameters to increase a likelihood that the machine-learned model will generate the preferred trajectory and decrease the likelihood that the machine-learned model will generate the rejected trajectory.

R: The method of paragraph Q, wherein training the learned reward model comprises: replacing, as the learned reward model, at least one of an output head or an intermediate output head of the machine-learned model with a single output head that outputs a regressed value indicating a value that is used as the reward or the demerit; generating, by the learned reward model and based at least in part on at least one of the first vehicle trajectory or the vehicle path, an estimated reward or demerit; determining, by a ruleset and based at least in part on at least one of the first vehicle trajectory or the vehicle path, a performance metric indicating a level of at least one of performance, comfort, or safety associated with at least one of the first vehicle trajectory or the vehicle path; and altering a parameter of the learned reward model, including the single output head, based at least in part on a difference between the performance metric and the estimated reward or demerit.

S: The method of any one of paragraphs P-R, wherein determining the first intermediate loss comprises determining a third difference between the first difference and the second difference.

T: The method of paragraph S, wherein: altering the parameter of the machine-learned model is based at least in part on determining a trajectory loss using the first intermediate loss and a second intermediate loss such that the trajectory loss is reduced; determining the second intermediate loss comprises: determining a fourth difference between a previous vehicle trajectory and a previous vehicle path, wherein the previous vehicle trajectory is generated by a previous version of the machine-learned model for the scenario and the previous vehicle path indicates a state of the vehicle according to output of the previous version of the machine-learned model during the scenario; determining a fifth difference between the previous vehicle trajectory and the preferred trajectory; and determining the second intermediate loss based at least in part on a sixth difference between the fourth difference and the fifth difference; and determining the trajectory loss comprises determining a seventh difference between the first intermediate loss and the second intermediate loss.

U: The method of paragraph T, wherein: determining the first intermediate loss further comprises determining the third difference between a logarithm of the first difference and a logarithm of the second difference; determining the second intermediate loss further comprises determining the sixth difference between a logarithm of the fourth difference and a logarithm of the fifth difference; and determining the trajectory loss comprises determining the seventh difference between a logarithm of the first intermediate loss and a logarithm of the second intermediate loss.

V: The method of either paragraph T or U, wherein: the trajectory loss is a first trajectory loss associated with the first vehicle trajectory and the first vehicle trajectory was generated at a first time in the scenario; altering the parameter of the machine-learned model is based at least in part on determining a final loss using the first trajectory loss and a second trajectory loss; the second trajectory loss is determined based at least in part on a second vehicle trajectory of the set of vehicle trajectories associated with the scenario and the second vehicle trajectory was generated at a second time in the scenario later than the first time; and determining the final loss is based at least in part on: scaling the first trajectory loss using a first weight; and scaling the second trajectory loss using a second weight that is less than the first weight based at least in part on the second time being later than the first time.

W: The method of any one of paragraphs P-V, wherein determining at least one of the first difference or the second difference comprises: determining a first set of differences in position, heading, velocity, or steering angle indicated by trajectories for which the first difference or the second difference is being determined; normalizing, as a normalized difference, the first set of differences based at least in part on a second set of differences determined for a second scenario and other trajectories associated with the second scenario; and weighting, as a weighted difference, the normalized difference based at least in part on a displacement along the rejected trajectory.

X: The method of any one of paragraphs P-W, wherein the vehicle is either a real vehicle or a simulated vehicle and the machine-learned model is trained to generate a trajectory for controlling the vehicle using at least one of sensor data or perception data that is determined based at least in part on the sensor data.

Y: The one or more non-transitory computer-readable media of any one of paragraphs G-O, wherein the operations further comprise transmitting the refined machine-learned model to the autonomous vehicle such that the autonomous vehicle is controlled based at least in part on an output of the refined machine-learned model.

Z: The method of any one of paragraphs P-X, further comprising transmitting the refined machine-learned model to the autonomous vehicle such that the autonomous vehicle is controlled based at least in part on an output of the refined machine-learned model.

While the example clauses described above are described with respect to one particular implementation, it should be understood that, in the context of this document, the content of the example clauses can also be implemented via a method, device, system, computer-readable medium, and/or another implementation. Additionally, any of examples A-Z may be implemented alone or in combination with any other one or more of the examples A-Z.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Such processes, or any portion thereof, may be performed iteratively in that any or all of the steps may be repeated. Of course, the disclosure is not meant to be so limiting and, as such, any process performed iteratively may comprise, in some examples, performance of the steps a single time.

Conditional language such as, among others, "may," "could," "may" or "might," unless specifically stated otherwise, are understood within the context to indicate that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a," "an" or other similar articles means singular and/or plural. When referring to a collection of items as a "set," it should be understood that the definition may include, but is not limited to, the common understanding of the term in mathematics to include any number of items including a null set (0), 1, 2, 3, . . . up to and including an infinite set.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
non-transitory memory storing processor-executable instructions that, when executed by the one or more processors, cause the system to perform operations comprising:
receiving a scenario indicating at least one of:
environment state data and object detection data,
a set of vehicle trajectories,
a vehicle path that an autonomous vehicle executed based at least in part on the set of vehicle trajectories, and
a driver trajectory executed by a human controlling a vehicle based at least in part on simulation data of the scenario,
wherein a vehicle trajectory of the set of vehicle trajectories is generated at a discrete time interval by a machine-learned model as part of controlling the autonomous vehicle during the scenario;

determining, between two trajectories associated with a scenario comprising a first vehicle trajectory of the set of vehicle trajectories and the driver trajectory, one of the two trajectories as a preferred trajectory and the other of the two trajectories as a rejected trajectory, wherein the first vehicle trajectory indicates predicted controls to operate the vehicle over a time horizon during the scenario;

determining a first intermediate loss based at least in part on:

determining a first difference between the first vehicle trajectory and the vehicle path indicating a state of the vehicle according to output of the machine-learned model during the scenario;

determining a second difference between the preferred trajectory and the first vehicle trajectory;

altering, as a refined machine-learned model, one or more parameters of the machine-learned model based at least in part on the first intermediate loss; and transmitting the refined machine-learned model to the autonomous vehicle such that the autonomous vehicle is controlled based at least in part on an output of the refined machine-learned model.

2. The system of claim 1, wherein altering the one or more parameters of the machine-learned model comprises:

determining, by a learned reward model, a reward based at least in part on the first difference and the preferred trajectory and a demerit based at least in part on the first difference and the rejected trajectory instead of determining the first intermediate loss; and altering, by reinforcement learning based at least in part on the reward and the demerit, the one or more parameters to increase a likelihood that the machine-learned model will generate the preferred trajectory and decrease the likelihood that the machine-learned model will generate the rejected trajectory.

3. The system of claim 2, wherein training the learned reward model comprises:

replacing, as the learned reward model, at least one of an output head or an intermediate output head of the machine-learned model with a single output head that outputs a regressed value indicating a value that is used as the reward or the demerit;

generating, by the learned reward model and based at least in part on at least one of the first vehicle trajectory or the vehicle path, an estimated reward or demerit;

determining, by a ruleset and based at least in part on at least one of the first vehicle trajectory or the vehicle path, a performance metric indicating a level of at least one of performance, comfort, or safety associated with at least one of the first vehicle trajectory or the vehicle path; and altering a parameter of the learned reward model, including the single output head, based at least in part on a difference between the performance metric and the estimated reward or demerit.

4. The system of claim 1, wherein:

determining the first intermediate loss comprises determining a third difference between the first difference and the second difference;

altering the one or more parameters of the machine-learned model is based at least in part on determining a trajectory loss using the first intermediate loss and a second intermediate loss such that the trajectory loss is reduced;

determining the second intermediate loss comprises:

determining a fourth difference between a previous vehicle trajectory and a previous vehicle path, wherein the previous vehicle trajectory is generated by a previous version of the machine-learned model for the scenario and the previous vehicle path indicates a state of the vehicle according to output of the previous version of the machine-learned model during the scenario;

determining a fifth difference between the previous vehicle trajectory and the preferred trajectory; and determining the second intermediate loss based at least in part on a sixth difference between the fourth difference and the fifth difference; and determining the trajectory loss comprises determining a seventh difference between the first intermediate loss and the second intermediate loss.

5. The system of claim 4, wherein:

the trajectory loss is a first trajectory loss associated with the first vehicle trajectory and the first vehicle trajectory was generated at a first time in the scenario;

altering the one or more parameters of the machine-learned model is based at least in part on determining a final loss using the first trajectory loss and a second trajectory loss;

the second trajectory loss is determined based at least in part on a second vehicle trajectory of the set of vehicle trajectories associated with the scenario and the second vehicle trajectory was generated at a second time in the scenario later than the first time; and determining the final loss is based at least in part on:

scaling the first trajectory loss using a first weight; and scaling the second trajectory loss using a second weight that is less than the first weight based at least in part on the second time being later than the first time.

6. The system of claim 1, wherein:

the set of vehicle trajectories is part of a superset of vehicle trajectories associated with multiple scenarios;

the operations further comprise determining that the set of vehicle trajectories are associated with a score that is below a score threshold; and determining the score is based at least in part on determining at least one of a safety cost, progress cost, or comfort cost associated with a set of vehicle trajectories.

7. One or more non-transitory computer-readable media storing processor-executable instructions that, when executed by one or more processors, perform operations comprising:

receiving a scenario, a set of vehicle trajectories, a vehicle path that an autonomous vehicle executed based at least in part on the set of vehicle trajectories, and a driver trajectory executed by a human controlling a vehicle based at least in part on simulation data of the scenario, wherein a vehicle trajectory of the set of vehicle trajectories is generated by a machine-learned model as part of controlling the autonomous vehicle during the scenario;

determining, between two trajectories associated with a scenario comprising a first vehicle trajectory of the set of vehicle trajectories and the driver trajectory, one of the two trajectories as a preferred trajectory and the other of the two trajectories as a rejected trajectory, wherein the first vehicle trajectory indicates predicted controls to operate the vehicle over a time horizon during the scenario;
determining a first intermediate loss based at least in part on:
determining a first difference between the first vehicle trajectory and the vehicle path;
determining a second difference between the preferred trajectory and the first vehicle trajectory; and
altering, as a refined machine-learned model, one or more parameters of the machine-learned model based at least in part on the first intermediate loss.

8. The one or more non-transitory computer-readable media of claim 7, wherein altering the one or more parameters of the machine-learned model comprises:
determining, by a learned reward model, a reward based at least in part on the first difference and the preferred trajectory and a demerit based at least in part on the first difference and the rejected trajectory instead of determining the first intermediate loss; and
altering, by reinforcement learning based at least in part on the reward and the demerit, the one or more parameters to increase a likelihood that the machine-learned model will generate the preferred trajectory and decrease the likelihood that the machine-learned model will generate the rejected trajectory.

9. The one or more non-transitory computer-readable media of claim 8, wherein training the learned reward model comprises:
replacing, as the learned reward model, at least one of an output head or an intermediate output head of the machine-learned model with a single output head that outputs a regressed value indicating a value that is used as the reward or the demerit;
generating, by the learned reward model and based at least in part on at least one of the first vehicle trajectory or the vehicle path, an estimated reward or demerit;
determining, by a ruleset and based at least in part on at least one of the first vehicle trajectory or the vehicle path, a performance metric indicating a level of at least one of performance, comfort, or safety associated with at least one of the first vehicle trajectory or the vehicle path; and
altering a parameter of the learned reward model, including the single output head, based at least in part on a difference between the performance metric and the estimated reward or demerit.

10. The one or more non-transitory computer-readable media of claim 7, wherein determining the first intermediate loss comprises determining a third difference between the first difference and the second difference.

11. The one or more non-transitory computer-readable media of claim 10, wherein:
altering the one or more parameters of the machine-learned model is based at least in part on determining a trajectory loss using the first intermediate loss and a second intermediate loss such that the trajectory loss is reduced;
determining the second intermediate loss comprises:
determining a fourth difference between a previous vehicle trajectory and a previous vehicle path, wherein the previous vehicle trajectory is generated by a previous version of the machine-learned model for the scenario and the previous vehicle path indicates a state of the vehicle according to output of the previous version of the machine-learned model during the scenario;
determining a fifth difference between the previous vehicle trajectory and the preferred trajectory; and
determining the second intermediate loss based at least in part on a sixth difference between the fourth difference and the fifth difference; and
determining the trajectory loss comprises determining a seventh difference between the first intermediate loss and the second intermediate loss.

12. The one or more non-transitory computer-readable media of claim 11, wherein:
determining the first intermediate loss further comprises determining the third difference between a logarithm of the first difference and a logarithm of the second difference;
determining the second intermediate loss further comprises determining the sixth difference between a logarithm of the fourth difference and a logarithm of the fifth difference; and
determining the trajectory loss comprises determining the seventh difference between a logarithm of the first intermediate loss and a logarithm of the second intermediate loss.

13. The one or more non-transitory computer-readable media of claim 11, wherein:
the trajectory loss is a first trajectory loss associated with the first vehicle trajectory and the first vehicle trajectory was generated at a first time in the scenario;
altering the one or more parameters of the machine-learned model is based at least in part on determining a final loss using the first trajectory loss and a second trajectory loss;
the second trajectory loss is determined based at least in part on a second vehicle trajectory of the set of vehicle trajectories associated with the scenario and the second vehicle trajectory was generated at a second time in the scenario later than the first time; and
determining the final loss is based at least in part on:
scaling the first trajectory loss using a first weight; and
scaling the second trajectory loss using a second weight that is less than the first weight based at least in part on the second time being later than the first time.

14. The one or more non-transitory computer-readable media of claim 7, wherein determining at least one of the first difference or the second difference comprises:
determining a first set of differences in position, heading, velocity, or steering angle indicated by trajectories for which the first difference or the second difference is being determined;
normalizing, as a normalized difference, the first set of differences based at least in part on a second set of differences determined for a second scenario and other trajectories associated with the second scenario; and
weighting, as a weighted difference, the normalized difference based at least in part on a displacement along the rejected trajectory.

15. The one or more non-transitory computer-readable media of claim 7, wherein the vehicle is either a real vehicle or a simulated vehicle and the machine-learned model is trained to generate a trajectory for controlling the vehicle using at least one of sensor data or perception data that is determined based at least in part on the sensor data.

16. A method comprising:
receiving a scenario, a set of vehicle trajectories, a vehicle path that an autonomous vehicle executed based at least in part on the set of vehicle trajectories, and a driver trajectory executed by a human controlling a vehicle based at least in part on simulation data of the scenario, wherein a vehicle trajectory of the set of vehicle trajectories is generated by a machine-learned model as part of controlling the autonomous vehicle during the scenario;

determining, between two trajectories associated with a scenario comprising a first vehicle trajectory of the set of vehicle trajectories and the driver trajectory, one of the two trajectories as a preferred trajectory and the other of the two trajectories as a rejected trajectory, wherein the first vehicle trajectory indicates predicted controls to operate the vehicle over a time horizon during the scenario;

determining a first intermediate loss based at least in part on:
determining a first difference between the first vehicle trajectory and the vehicle path;
determining a second difference between the preferred trajectory and the first vehicle trajectory; and
altering, as a refined machine-learned model, one or more parameters of the machine-learned model based at least in part on the first intermediate loss.

17. The method of claim 16, wherein altering the one or more parameters of the machine-learned model comprises:
determining, by a learned reward model, a reward based at least in part on the first difference and the preferred trajectory and a demerit based at least in part on the first difference and the rejected trajectory instead of determining the first intermediate loss; and
altering, by reinforcement learning based at least in part on the reward and the demerit, the one or more parameters to increase a likelihood that the machine-learned model will generate the preferred trajectory and decrease the likelihood that the machine-learned model will generate the rejected trajectory.

18. The method of claim 16, wherein:
determining the first intermediate loss comprises determining a third difference between the first difference and the second difference
altering the one or more parameters of the machine-learned model is based at least in part on determining a trajectory loss using the first intermediate loss and a second intermediate loss such that the trajectory loss is reduced;
determining the second intermediate loss comprises:
determining a fourth difference between a previous vehicle trajectory and a previous vehicle path, wherein the previous vehicle trajectory is generated by a previous version of the machine-learned model for the scenario and the previous vehicle path indicates a state of the vehicle according to output of the previous version of the machine-learned model during the scenario;
determining a fifth difference between the previous vehicle trajectory and the preferred trajectory; and
determining the second intermediate loss based at least in part on a sixth difference between the fourth difference and the fifth difference; and
determining the trajectory loss comprises determining a seventh difference between the first intermediate loss and the second intermediate loss.

19. The method of claim 18, wherein:
the trajectory loss is a first trajectory loss associated with the first vehicle trajectory and the first vehicle trajectory was generated at a first time in the scenario;
altering the one or more parameters of the machine-learned model is based at least in part on determining a final loss using the first trajectory loss and a second trajectory loss;
the second trajectory loss is determined based at least in part on a second vehicle trajectory of the set of vehicle trajectories associated with the scenario and the second vehicle trajectory was generated at a second time in the scenario later than the first time; and
determining the final loss is based at least in part on:
scaling the first trajectory loss using a first weight; and
scaling the second trajectory loss using a second weight that is less than the first weight based at least in part on the second time being later than the first time.

20. The method of claim 16, wherein the vehicle is either a real vehicle or a simulated vehicle and the machine-learned model is trained to generate a trajectory for controlling the vehicle using at least one of sensor data or perception data that is determined based at least in part on the sensor data.

* * * * *